United States Patent
Xue et al.

(10) Patent No.: US 11,881,917 B2
(45) Date of Patent: Jan. 23, 2024

(54) COMMUNICATIONS METHOD AND APPARATUS

(71) Applicant: HUAWEI TECHNOLOGIES CO., LTD., Shenzhen (CN)

(72) Inventors: Yifan Xue, Beijing (CN); Li Shen, Shenzhen (CN); Jian Wang, Beijing (CN); Da Wang, Shenzhen (CN); Haitao Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/988,212

(22) Filed: Nov. 16, 2022

(65) Prior Publication Data

US 2023/0077296 A1    Mar. 9, 2023

Related U.S. Application Data

(63) Continuation of application No. 17/256,218, filed as application No. PCT/CN2019/093181 on Jun. 27, 2019, now Pat. No. 11,552,683.

(51) Int. Cl.
*H04L 1/02*    (2006.01)
*H04B 7/06*    (2006.01)
(Continued)

(52) U.S. Cl.
CPC ......... *H04B 7/0608* (2013.01); *H04B 7/0632* (2013.01); *H04L 5/0048* (2013.01); *H04W 72/046* (2013.01)

(58) Field of Classification Search
CPC ..... H04L 1/0046; H04L 5/003; H04L 5/0094; H04W 72/04; H04W 72/12;
(Continued)

(56) References Cited

U.S. PATENT DOCUMENTS 8,611,907 B2 * 12/2013 Aaron ................. H04W 72/542
                                                          455/445
2002/0196128 A1 * 12/2002 Gaus, Jr. ................ H04B 3/546
                                                          375/259
(Continued)

FOREIGN PATENT DOCUMENTS

CA    3042828 A1    5/2018
CN    102075274 A    5/2011
(Continued)

OTHER PUBLICATIONS

"3rd Generation Partnership Project; Technical Specification Group Radio Access Network; NR;User Equipment (UE) radio access capabilities(Release 15)", 3GPP TS 38.306 V15.2.0 (Jun. 2018), 28 pages.

(Continued)

*Primary Examiner* — Khai Tran
(74) *Attorney, Agent, or Firm* — Maier & Maier, PLLC

(57) ABSTRACT

A communications method and apparatus implement radio frequency link sharing, improve radio frequency link utilization, and increase an uplink transmission rate. The method is as follows: a terminal receives first configuration information and second configuration information from a first network device. The first configuration information is used to indicate a first reference signal resource of a first antenna port, and the second configuration information is used to indicate a second reference signal resource of a second antenna port; or the first configuration information is used to indicate a third reference signal resource of a first quantity of antenna ports, and the second configuration information is used to indicate a fourth reference signal resource of a second quantity of antenna ports. The terminal sends a first reference signal based on the first configuration information (Continued)

and sends a second reference signal based on the second configuration information.

15 Claims, 7 Drawing Sheets

(51) Int. Cl.
  *H04L 5/00* (2006.01)
  *H04W 72/044* (2023.01)
(58) Field of Classification Search
  CPC ... H04W 72/046; H04W 76/16; H04W 76/30; H04W 8/22; H04W 52/0235; H04B 7/0608; H04B 7/0626; H04B 7/0632
  USPC .......................................... 376/267, 260, 262
  See application file for complete search history.

(56) References Cited

U.S. PATENT DOCUMENTS

| | | |
|---|---|---|
| 2010/0215114 A1 | 8/2010 | Kim et al. |
| 2011/0244900 A1 | 10/2011 | Noh et al. |
| 2013/0242895 A1 | 9/2013 | Chen et al. |
| 2014/0169321 A1 | 6/2014 | Imamura et al. |
| 2015/0063177 A1 | 3/2015 | Kim et al. |
| 2015/0215826 A1 | 7/2015 | Yamada |
| 2015/0222402 A1 | 8/2015 | Ouchi et al. |
| 2015/0249972 A1 | 9/2015 | You et al. |
| 2015/0304084 A1 | 10/2015 | Suzuki et al. |
| 2015/0319753 A1 | 11/2015 | Chen et al. |
| 2016/0088512 A1 | 3/2016 | Bergström et al. |
| 2016/0191221 A1 | 6/2016 | Fukuta et al. |
| 2016/0227426 A1 | 8/2016 | Hwang et al. |
| 2017/0026100 A1 | 1/2017 | Wang et al. |
| 2017/0142559 A1* | 5/2017 | Feng ..................... H04W 76/10 |
| 2018/0049073 A1 | 2/2018 | Dinan et al. |
| 2018/0091273 A1 | 3/2018 | Choi et al. |
| 2018/0123654 A1 | 5/2018 | Park et al. |
| 2018/0213527 A1 | 7/2018 | Liu et al. |
| 2019/0014587 A1* | 1/2019 | Zhang ................... H04W 72/12 |
| 2020/0052770 A1 | 2/2020 | Chen et al. |

FOREIGN PATENT DOCUMENTS

| | | |
|---|---|---|
| CN | 102412889 A | 4/2012 |
| CN | 103748913 A | 4/2014 |
| CN | 104137465 A | 11/2014 |
| CN | 104584625 A | 4/2015 |
| CN | 104685948 A | 6/2015 |
| CN | 106714329 A | 5/2017 |
| CN | 107306176 A | 10/2017 |
| CN | 107370585 A | 11/2017 |
| CN | 108024365 A | 5/2018 |
| CN | 108200091 A | 6/2018 |
| JP | 2013527726 A | 6/2013 |
| JP | 2013197877 A | 9/2013 |
| JP | 2015126394 A | 7/2015 |
| JP | 2016502331 A | 1/2016 |
| JP | 2016039565 A | 3/2016 |
| JP | 2016511563 A | 4/2016 |
| JP | 2017526218 A | 9/2017 |
| JP | 2018026626 A | 2/2018 |
| JP | 2018056865 A | 4/2018 |
| KR | 20170019367 A | 2/2017 |
| KR | 1020170019367 A | 2/2017 |
| WO | 2013042982 A1 | 3/2013 |

OTHER PUBLICATIONS

"3rd Generation Partnership Project; Technical Specification Group Radio Access Network; NR; Radio Resource Control (RRC) protocol specification(Release 15)", 3GPP TS 38.331 V15.2.1 (Jun. 2018), 303 pages.

"3rd Generation Partnership Project; Technical Specification Group Radio Access Network; NR; User Equipment (UE) radio transmission and reception; Part 1: Range 1 Standalone (Release 15)", 3GPP TS 38.101-1 V15.1.0 (Mar. 2018), 71 pages.

* cited by examiner

COMMUNICATIONS METHOD AND APPARATUS

CROSS-REFERENCE TO RELATED APPLICATIONS

This application is a continuation of U.S. patent application Ser. No. 17/256,218, filed on Dec. 27, 2020, which is a national stage of International Application No. PCT/CN2019/093181, filed on Jun. 27, 2019. The International Application claims priority to Chinese Patent Application No. 201810681748.0, filed on Jun. 27, 2018. All of the aforementioned patent applications are hereby incorporated by reference in their entireties.

TECHNICAL FIELD

The embodiments relate to the field of communications technologies, a communications method, and an apparatus.

BACKGROUND

In a wireless communications system, uplink communication of a terminal may support a plurality of transmit links, and downlink communication of the terminal may support a plurality of receive links. Both the transmit link and the receive link are radio frequency links. As shown in FIG. 1, when a terminal needs to send an uplink signal, the terminal generates a baseband signal on a baseband, a radio frequency signal is generated after the baseband signal passes through a radio frequency transmit link, and the radio frequency signal is sent by using an antenna. A radio frequency link includes a radio frequency integrated circuit, a power amplifier, and a duplexer/filter. Similarly, the terminal receives a signal over a corresponding radio frequency receive link.

The terminal may support a plurality of transmit links or a plurality of receive links. For example, the terminal supports one transmit link and two receive links. For another example, the terminal may support two transmit links and four receive links. When the terminal performs uplink communication with a network side over two transmit links, a communication rate higher than that of one transmit link can be provided.

Currently, the terminal may access a plurality of network devices, and can communicate with the plurality of network devices. In this case, the terminal communicates with different network devices over different radio frequency links. However, for any radio frequency link, the terminal does not always communicate with a corresponding network device over the radio frequency link. For example, when the network device corresponding to the radio frequency link does not schedule the terminal or when the terminal sends a signal to another network device, the radio frequency link is idle. Consequently, when the terminal is provided with a plurality of radio frequency links to communicate with a plurality of accessed network devices, an idle radio frequency link exists and a resource waste is caused.

SUMMARY

The embodiments may provide a communications method and apparatus, to resolve a problem that a radio frequency links is idle and resources are wasted when a terminal is provided with a plurality of radio frequency links to communicate with a plurality of accessed network devices.

According to a first aspect, a communications method is provided. The method may be performed by a terminal. The method is implemented by performing the following steps: The terminal receives first configuration information and second configuration information from a first network device. The first configuration information is used to indicate a first reference signal resource of a first antenna port, and the second configuration information is used to indicate a second reference signal resource of a second antenna port; or the first configuration information is used to indicate a third reference signal resource of a first quantity of antenna ports, and the second configuration information is used to indicate a fourth reference signal resource of a second quantity of antenna ports. The terminal sends a first reference signal based on the first configuration information and sends a second reference signal based on the second configuration information. In this way, different reference signal resources are configured for different antenna ports, so that the terminal can send different reference signals on the different reference signal resources, and the network device determines, by using the different reference signals, channel quality of radio frequency links corresponding to the different antenna ports, thereby implementing radio frequency link sharing, improving radio frequency link utilization, and increasing an uplink transmission rate. Alternatively, different reference signal resources are configured for different quantities of antenna ports, so that reference signal resources corresponding to different radio frequency links can be implicitly indicated to the terminal. Therefore, the terminal can send different reference signals on different reference signal resources, and the network device determines, by using the different reference signals, channel quality of radio frequency links corresponding to different antenna ports, thereby implementing radio frequency link sharing, improving radio frequency link utilization, and increasing an uplink transmission rate.

With reference to the first aspect, in a first possible implementation of the first aspect, an information element IE in the first configuration information is used to indicate the first reference signal resource, or an IE in a resource type in the first configuration information is used to indicate the first reference signal resource; and an IE in the second configuration information is used to indicate the second reference signal resource, or an IE in a resource type in the second configuration information is used to indicate the second reference signal resource. There may be two possible implementations of indicating a reference signal resource.

With reference to the first aspect or the first possible implementation of the first aspect, in a second possible implementation of the first aspect, the terminal receives third configuration information from the first network device. The third configuration information is used to indicate the terminal to send a reference signal to the first network device through both the first antenna port and the second antenna port within a first time and send a reference signal to the first network device through only the first antenna port within a second time, or the third configuration information is used to indicate the terminal to send a reference signal to the first network device through the second quantity of antenna ports within the first time and send a reference signal to the first network device through the first quantity of antenna ports within the second time. The first time and the second time are adjacent and are alternated in time domain. The terminal sends a reference signal based on the third configuration information. In this way, a second network device can schedule the terminal within the second time through protocol specification or negotiation between a network side and a terminal side, thereby avoiding a conflict caused when the first network device and the second network device schedule the terminal.

With reference to the first aspect, in a third possible implementation of the first aspect, if the first configuration information is used to indicate the third reference signal resource of the first quantity of antenna ports, and the second configuration information is used to indicate the fourth reference signal resource of the second quantity of antenna ports, the first configuration information is further used to indicate port numbers of the first quantity of antenna ports, and the second configuration information is further used to indicate port numbers of the second quantity of antenna ports. In this way, the network device can jointly perform channel state estimation based on a plurality of reference signals, thereby improving estimation precision.

With reference to any one of the first aspect and the first to the third possible implementations of the first aspect, in a fourth possible implementation of the first aspect, the terminal reports an uplink communication capability of the terminal to the first network device or the second network device. The uplink communication capability of the terminal includes or indicates that an antenna capability used when the terminal sends a signal to the first network device is a first value in a first application scenario, and the antenna capability used when the terminal sends a signal to the first network device is a second value in a second application scenario. The antenna capability includes or indicates a quantity of antenna ports, a quantity of layers, a quantity of radio frequency links, a quantity of antennas, a maximum quantity of antenna ports, a maximum quantity of layers, a maximum quantity of radio frequency links, or a maximum quantity of antennas. The terminal reports the uplink communication capability of the terminal to the network device, and the network device determines, by using the uplink communication capability reported by the terminal, that the terminal supports switching from an antenna capability value to another antenna capability value. For example, when the terminal sends a signal to the first network device through the first antenna port and sends a signal to the second network device through the second antenna port, if the terminal supports switching of the antenna capability from one port to two ports, when the second antenna port is idle, the terminal may opportunistically send a signal to the first network device through both the second antenna port and the first antenna port. This can implement radio frequency link sharing or antenna port sharing, improve radio frequency link utilization or antenna port utilization, increase an uplink transmission rate, and improve a communication capability.

With reference to the first aspect, in the first application scenario, the terminal may send a signal to the second network device. In the second application scenario, the terminal may not send a signal to the second network device. Alternatively, in the first application scenario, the terminal may be allowed to send a first time domain resource of a signal to the second network device, and, in the second application scenario, the terminal may not be allowed to send a second time domain resource of a signal to the second network device. It is determined that the first application scenario is a case in which the second antenna port is idle.

With reference to the first aspect, the terminal may report the uplink communication capability of the terminal to the first network device or the second network device in the following manner: The terminal sends a first message to the first network device or the second network device. The first message includes a first information element IE, and the first IE is used to indicate the uplink communication capability of the terminal. The terminal may report the communication capability.

With reference to the first aspect, the uplink communication capability of the terminal may further include or further indicate that the antenna capability used when the terminal sends a signal to the first network device is the second value. In this case, the terminal sends a second message to the first network device or the second network device. The second message includes a second IE and a third IE. The second IE is used to indicate that the antenna capability used when the terminal sends a signal to the first network device is the second value. The third IE is used to indicate that the antenna capability used when the terminal sends a signal to the first network device is the first value in the first application scenario, and the antenna capability used when the terminal sends a signal to the first network device is the second value in the second application scenario. The terminal may report the communication capability.

With reference to the first aspect, the terminal may receive indication information from the first network device or the second network device. The indication information is used to indicate the terminal to enable the uplink communication capability of the terminal. In this way, the uplink communication capability of the terminal can be enabled according to a network-side indication, and a capability of the network device can be balanced.

According to a second aspect, a communications method is provided. The method may be performed by a terminal. The method is implemented by performing the following steps: The terminal establishes a connection to a first network device or a second network device, and the terminal reports an uplink communication capability of the terminal to the first network device or the second network device. The uplink communication capability of the terminal includes or indicates that an antenna capability used when the terminal sends a signal to the first network device is a first value in a first application scenario, and the antenna capability used when the terminal sends a signal to the first network device is a second value in a second application scenario. The antenna capability includes or indicates a quantity of antenna ports, a quantity of layers, a quantity of radio frequency links, a quantity of antennas, a maximum quantity of antenna ports, a maximum quantity of layers, a maximum quantity of radio frequency links, or a maximum quantity of antennas. The terminal reports the uplink communication capability of the terminal to the network device, and the network device determines, by using the uplink communication capability reported by the terminal, that the terminal supports switching from an antenna capability value to another antenna capability value. For example, when the terminal sends a signal to the first network device through a first antenna port and sends a signal to the second network device through a second antenna port, if the terminal supports switching of the antenna capability from one port to two ports, when the second antenna port is idle, the terminal may opportunistically send a signal to the first network device through both the second antenna port and the first antenna port. This can implement radio frequency link sharing or antenna port sharing, improve radio frequency link utilization or antenna port utilization, increase an uplink transmission rate, and improve a communication capability.

With reference to the second aspect, in a first possible implementation of the second aspect, the first application scenario is that the terminal sends a signal to the second network device, and the second application scenario is that the terminal does not send a signal to the second network device; or the first application scenario is that the terminal is allowed to send a first time domain resource of a signal to the second network device, and the second application scenario is that the terminal is not allowed to send a second time domain resource of a signal to the second network device. It is determined that the first application scenario is a case in which the second antenna port is idle.

With reference to the second aspect or the first possible implementation of the second aspect, in a second possible implementation of the second aspect, the terminal reports the uplink communication capability of the terminal to the first network device or the second network device in the following manner: The terminal sends a first message to the first network device or the second network device. The first message includes a first information element IE, and the first IE is used to indicate the uplink communication capability of the terminal. The terminal may report the communication capability.

With reference to the second aspect or the first possible implementation of the second aspect, in a third possible implementation of the second aspect, the uplink communication capability of the terminal further includes or further indicates that the antenna capability used when the terminal sends a signal to the first network device is the second value. In this case, the terminal sends a second message to the first network device or the second network device. The second message includes a second IE and a third IE. The second IE is used to indicate that the antenna capability used when the terminal sends a signal to the first network device is the second value. The third IE is used to indicate that the antenna capability used when the terminal sends a signal to the first network device is the first value in the first application scenario, and the antenna capability used when the terminal sends a signal to the first network device is the second value in the second application scenario. The terminal may report the communication capability.

With reference to any one of the second aspect and the first to the third possible implementations of the second aspect, in a fourth possible implementation of the second aspect, the terminal receives indication information from the first network device or the second network device. The indication information is used to indicate the terminal to enable the uplink communication capability of the terminal. In this way, the uplink communication capability of the terminal can be enabled according to a network-side indication, and a capability of the network device can be balanced.

With reference to any one of the second aspect and the first to the fourth possible implementations of the second aspect, in a fifth possible implementation of the second aspect, the terminal receives first configuration information and second configuration information from the first network device. The first configuration information is used to indicate a first reference signal resource of the first antenna port, and the second configuration information is used to indicate a second reference signal resource of the second antenna port; or the first configuration information is used to indicate a third reference signal resource of a first quantity of antenna ports, and the second configuration information is used to indicate a fourth reference signal resource of a second quantity of antenna ports. The terminal sends a first reference signal based on the first configuration information and sends a second reference signal based on the second configuration information. In this way, different reference signal resources are configured for different antenna ports, so that the terminal can send different reference signals on the different reference signal resources, and the network device determines, by using the different reference signals, channel quality of radio frequency links corresponding to the different antenna ports, thereby implementing radio frequency link sharing, improving radio frequency link utilization, and increasing an uplink transmission rate. Alternatively, different reference signal resources are configured for different quantities of antenna ports, so that reference signal resources corresponding to different radio frequency links can be implicitly indicated to the terminal. Therefore, the terminal can send different reference signals on different reference signal resources, and the network device determines, by using the different reference signals, channel quality of radio frequency links corresponding to different antenna ports, thereby implementing radio frequency link sharing, improving radio frequency link utilization, and increasing an uplink transmission rate.

With reference to the fifth possible implementation of the second aspect, in a sixth possible implementation of the second aspect, an information element IE in the first configuration information is used to indicate the first reference signal resource, or an IE in a resource type in the first configuration information is used to indicate the first reference signal resource; and an IE in the second configuration information is used to indicate the second reference signal resource, or an IE in a resource type in the second configuration information is used to indicate the second reference signal resource. There may be two possible implementations of indicating a reference signal resource.

With reference to the fifth possible implementation of the second aspect or the sixth possible implementation of the second aspect, in a seventh possible implementation of the second aspect, the terminal receives third configuration information from the first network device. The third configuration information is used to indicate the terminal to send a reference signal to the first network device through both the first antenna port and the second antenna port within a first time and send a reference signal to the first network device through only the first antenna port within a second time, or the third configuration information is used to indicate the terminal to send a reference signal to the first network device through the second quantity of antenna ports within the first time and send a reference signal to the first network device through the first quantity of antenna ports within the second time. The first time and the second time are adjacent and are alternated in time domain. The terminal sends a reference signal based on the third configuration information. In this way, the second network device can schedule the terminal within the second time through protocol specification or negotiation between a network side and a terminal side, thereby avoiding a conflict caused when the first network device and the second network device schedule the terminal.

With reference to the fifth possible implementation of the second aspect, in an eighth possible implementation of the second aspect, if the first configuration information is used to indicate the third reference signal resource of the first quantity of antenna ports, and the second configuration information is used to indicate the fourth reference signal resource of the second quantity of antenna ports, the first configuration information is further used to indicate port numbers of the first quantity of antenna ports, and the second configuration information is further used to indicate port numbers of the second quantity of antenna ports. In this way, the network device can jointly perform channel state estimation based on a plurality of reference signals, thereby improving estimation precision.

According to a third aspect, a communications method is provided. The method may be performed by a terminal. The method is implemented by performing the following steps: In a first application scenario, the terminal communicates with a first network device over a first radio frequency link and communicates with a second network device over a second radio frequency link. In a second application scenario, the terminal communicates with the first network device over the first radio frequency link and the second radio frequency link. This can implement radio frequency link sharing or antenna port sharing, improve radio frequency link utilization or antenna port utilization, increase an uplink transmission rate, and improve a communication capability.

With reference to the third aspect, in a first possible implementation of the third aspect, the first application scenario is that the terminal sends a signal to the second network device, and the second application scenario is that the terminal does not send a signal to the second network device; or the first application scenario is that the terminal is allowed to send a first time domain resource of a signal to the second network device, and the second application scenario is that the terminal is not allowed to send a second time domain resource of a signal to the second network device. It is determined that the first application scenario is a case in which a second antenna port is idle.

With reference to the third aspect or the first possible implementation of the third aspect, in a second possible implementation of the third aspect, in the first application scenario, the terminal communicates with the first network device on a first frequency domain resource over the first radio frequency link and communicates with the second network device on a second frequency domain resource over the second radio frequency link. In the second application scenario, the terminal communicates with the first network device on the first frequency domain resource over the first radio frequency link and the second radio frequency link.

With reference to any one of the third aspect and the first and the second possible implementations of the third aspect, in a third possible implementation of the third aspect, the first time domain resource is a subframe, a slot, or a symbol, and the second time domain resource is a subframe, a slot, or a symbol.

With reference to any one of the third aspect and the first to the third possible implementations of the third aspect, in a fourth possible implementation of the third aspect, the terminal receives first configuration information and second configuration information from the first network device. The first configuration information is used to indicate a first reference signal resource of a first antenna port, and the second configuration information is used to indicate a second reference signal resource of a second antenna port; or the first configuration information is used to indicate a third reference signal resource of a first quantity of antenna ports, and the second configuration information is used to indicate a fourth reference signal resource of a second quantity of antenna ports. The terminal sends a first reference signal based on the first configuration information and sends a second reference signal based on the second configuration information. In this way, different reference signal resources are configured for different antenna ports, so that the terminal can send different reference signals on the different reference signal resources, and the network device determines, by using the different reference signals, channel quality of radio frequency links corresponding to the different antenna ports, thereby implementing radio frequency link sharing, improving radio frequency link utilization, and increasing an uplink transmission rate. Alternatively, different reference signal resources are configured for different quantities of antenna ports, so that reference signal resources corresponding to different radio frequency links can be implicitly indicated to the terminal. Therefore, the terminal can send different reference signals on different reference signal resources, and the network device determines, by using the different reference signals, channel quality of radio frequency links corresponding to different antenna ports, thereby implementing radio frequency link sharing, improving radio frequency link utilization, and increasing an uplink transmission rate.

With reference to the fourth possible implementation of the third aspect, in a fifth possible implementation of the third aspect, an information element IE in the first configuration information is used to indicate the first reference signal resource, or an IE in a resource type in the first configuration information is used to indicate the first reference signal resource; and an IE in the second configuration information is used to indicate the second reference signal resource, or an IE in a resource type in the second configuration information is used to indicate the second reference signal resource. There may be two possible implementations of indicating a reference signal resource.

With reference to the fourth or the fifth possible implementation of the third aspect, in a sixth possible implementation of the third aspect, the terminal receives third configuration information from the first network device. The third configuration information is used to indicate the terminal to send a reference signal to the first network device through both the first antenna port and the second antenna port within a first time and send a reference signal to the first network device through only the first antenna port within a second time, or the third configuration information is used to indicate the terminal to send a reference signal to the first network device through the second quantity of antenna ports within the first time and send a reference signal to the first network device through the first quantity of antenna ports within the second time. The first time and the second time are adjacent and are alternated in time domain. The terminal sends a reference signal based on the third configuration information. In this way, the second network device can schedule the terminal within the second time through protocol specification or negotiation between a network side and a terminal side, thereby avoiding a conflict caused when the first network device and the second network device schedule the terminal.

With reference to the fourth possible implementation of the third aspect, in a seventh possible implementation of the third aspect, if the first configuration information is used to indicate the third reference signal resource of the first quantity of antenna ports, and the second configuration information is used to indicate the fourth reference signal resource of the second quantity of antenna ports, the first configuration information is further used to indicate port numbers of the first quantity of antenna ports, and the second configuration information is further used to indicate port numbers of the second quantity of antenna ports. In this way, the network device can jointly perform channel state estimation based on a plurality of reference signals, thereby improving estimation precision.

With reference to any one of the third aspect and the first to the seventh possible implementations of the third aspect, in an eighth possible implementation of the third aspect, the terminal reports an uplink communication capability of the terminal to the first network device or the second network device. The uplink communication capability of the terminal includes or indicates that an antenna capability used when the terminal sends a signal to the first network device is a first value in the first application scenario, and the antenna capability used when the terminal sends a signal to the first network device is a second value in the second application scenario. The antenna capability includes or indicates a quantity of antenna ports, a quantity of layers, a quantity of radio frequency links, a quantity of antennas, a maximum quantity of antenna ports, a maximum quantity of layers, a maximum quantity of radio frequency links, or a maximum quantity of antennas. The terminal reports the uplink communication capability of the terminal to the network device, and the network device determines, by using the uplink communication capability reported by the terminal, that the terminal supports switching from an antenna capability value to another antenna capability value. For example, when the terminal sends a signal to the first network device through the first antenna port and sends a signal to the second network device through the second antenna port, if the terminal supports switching of the antenna capability from one port to two ports, when the second antenna port is idle, the terminal may opportunistically send a signal to the first network device through both the second antenna port and the first antenna port. This can implement radio frequency link sharing or antenna port sharing, improve radio frequency link utilization or antenna port utilization, increase an uplink transmission rate, and improve a communication capability.

With reference to the eighth possible implementation of the third aspect, in a ninth possible implementation of the third aspect, the terminal reports the uplink communication capability of the terminal to the first network device or the second network device in the following manner: The terminal sends a first message to the first network device or the second network device. The first message includes a first information element IE, and the first IE is used to indicate the uplink communication capability of the terminal. The terminal may report the communication capability.

With reference to the eighth possible implementation of the third aspect, in a tenth possible implementation of the third aspect, the uplink communication capability of the terminal further includes or further indicates that the antenna capability used when the terminal sends a signal to the first network device is the second value. In this case, the terminal sends a second message to the first network device or the second network device. The second message includes a second IE and a third IE. The second IE is used to indicate that the antenna capability used when the terminal sends a signal to the first network device is the second value. The third IE is used to indicate that the antenna capability used when the terminal sends a signal to the first network device is the first value in the first application scenario, and the antenna capability used when the terminal sends a signal to the first network device is the second value in the second application scenario. The terminal may report the communication capability.

With reference to any one of the third aspect and the first to the tenth possible implementations of the third aspect, in an eleventh possible implementation of the third aspect, the terminal receives indication information from the first network device or the second network device. The indication information is used to indicate the terminal to enable the uplink communication capability of the terminal. In this way, the uplink communication capability of the terminal can be enabled according to a network-side indication, and a capability of the network device can be balanced.

According to a fourth aspect, a communications method is provided. The method may be performed by a network device, denoted as a first network device. The method is implemented by performing the following steps: The first network device sends first configuration information and second configuration information to a terminal. The first configuration information is used to indicate a first reference signal resource of a first antenna port, and the second configuration information is used to indicate a second reference signal resource of a second antenna port; or the first configuration information is used to indicate a third reference signal resource of a first quantity of antenna ports, and the second configuration information is used to indicate a fourth reference signal resource of a second quantity of antenna ports. The first network device receives a first reference signal and a second reference signal that are sent by the terminal. In this way, different reference signal resources are configured for different antenna ports, so that the terminal can send different reference signals on the different reference signal resources, and the network device determines, by using the different reference signals, channel quality of radio frequency links corresponding to the different antenna ports, thereby implementing radio frequency link sharing, improving radio frequency link utilization, and increasing an uplink transmission rate. Alternatively, different reference signal resources are configured for different quantities of antenna ports, so that reference signal resources corresponding to different radio frequency links can be implicitly indicated to the terminal. Therefore, the terminal can send different reference signals on different reference signal resources, and the network device determines, by using the different reference signals, channel quality of radio frequency links corresponding to different antenna ports, thereby implementing radio frequency link sharing, improving radio frequency link utilization, and increasing an uplink transmission rate.

With reference to the fourth aspect, in a first possible implementation of the fourth aspect, an information element IE in the first configuration information is used to indicate the first reference signal resource, or an IE in a resource type in the first configuration information is used to indicate the first reference signal resource; and an IE in the second configuration information is used to indicate the second reference signal resource, or an IE in a resource type in the second configuration information is used to indicate the second reference signal resource. There may be two possible implementations of indicating a reference signal resource.

With reference to the fourth aspect or the first possible implementation of the fourth aspect, in a second possible implementation of the fourth aspect, the method further includes: The first network device sends third configuration information to the terminal. The third configuration information is used to indicate the terminal to send a reference signal to the first network device through both the first antenna port and the second antenna port within a first time and send a reference signal to the first network device through only the first antenna port within a second time, or the third configuration information is used to indicate the terminal to send a reference signal to the first network device through the second quantity of antenna ports within the first time and send a reference signal to the first network device through the first quantity of antenna ports within the second time. The first time and the second time are adjacent and are alternated in time domain. In this way, a second network device can schedule the terminal within the second time through protocol specification or negotiation between a network side and a terminal side, thereby avoiding a conflict caused when the first network device and the second network device schedule the terminal.

With reference to the fourth aspect, in a third possible implementation of the fourth aspect, if the first configuration information is used to indicate the third reference signal resource of the first quantity of antenna ports, and the second configuration information is used to indicate the fourth reference signal resource of the second quantity of antenna ports, the first configuration information is further used to indicate port numbers of the first quantity of antenna ports, and the second configuration information is further used to indicate port numbers of the second quantity of antenna ports.

With reference to any one of the fourth aspect and the first to the third possible implementations of the fourth aspect, in a fourth possible implementation of the fourth aspect, the first network device receives an uplink communication capability of the terminal that is reported by the terminal. The uplink communication capability of the terminal includes or indicates that an antenna capability used when the terminal sends a signal to the first network device is a first value in a first application scenario, and the antenna capability used when the terminal sends a signal to the first network device is a second value in a second application scenario. The antenna capability includes or indicates a quantity of antenna ports, a quantity of layers, a quantity of radio frequency links, a quantity of antennas, a maximum quantity of antenna ports, a maximum quantity of layers, a maximum quantity of radio frequency links, or a maximum quantity of antennas. The terminal reports the uplink communication capability of the terminal to the network device, and the network device determines, by using the uplink communication capability reported by the terminal, that the terminal supports switching from an antenna capability value to another antenna capability value. For example, when the terminal sends a signal to the first network device through the first antenna port and sends a signal to the second network device through the second antenna port, if the terminal supports switching of the antenna capability from one port to two ports, when the second antenna port is idle, the terminal may opportunistically send a signal to the first network device through both the second antenna port and the first antenna port. This can implement radio frequency link sharing or antenna port sharing, improve radio frequency link utilization or antenna port utilization, increase an uplink transmission rate, and improve a communication capability.

With reference to the fourth aspect, in the first application scenario, the terminal may send a signal to the second network device, and, in the second application scenario, the terminal may not send a signal to the second network device. Alternatively, in the first application scenario, the terminal may be allowed to send a first time domain resource of a signal to the second network device, and, in the second application scenario, the terminal may not be allowed to send a second time domain resource of a signal to the second network device.

With reference to the fourth aspect, the first network device may send indication information to the terminal. The indication information is used to indicate the terminal to enable the uplink communication capability of the terminal. In this way, the uplink communication capability of the terminal can be enabled according to a network-side indication, and a capability of the network device can be balanced.

According to a fifth aspect, a communications method is provided. The method may be performed by a terminal. The method may be implemented by performing the following steps: The terminal receives configuration information from a network device. The configuration information is used to indicate a port number and a reference signal resource that are used by the terminal to send a reference signal to the network device. The terminal sends the reference signal to the network device on the reference signal resource based on the configuration information by using the port number. By using a configured port number used for signal sending, the terminal can determine an antenna port and can estimate a channel status corresponding to the antenna port.

According to a sixth aspect, a communications apparatus is provided. The apparatus may be applied to a terminal. The apparatus includes a receiving unit and a sending unit. The receiving unit is configured to receive first configuration information and second configuration information from a first network device. The first configuration information is used to indicate a first reference signal resource of a first antenna port, and the second configuration information is used to indicate a second reference signal resource of a second antenna port; or the first configuration information is used to indicate a third reference signal resource of a first quantity of antenna ports, and the second configuration information is used to indicate a fourth reference signal resource of a second quantity of antenna ports. The sending unit is configured to: send a first reference signal based on the first configuration information and send a second reference signal based on the second configuration information. In this way, different reference signal resources are configured for different antenna ports, so that the terminal can send different reference signals on the different reference signal resources, and the network device determines, by using the different reference signals, channel quality of radio frequency links corresponding to the different antenna ports, thereby implementing radio frequency link sharing, improving radio frequency link utilization, and increasing an uplink transmission rate. Alternatively, different reference signal resources are configured for different quantities of antenna ports, so that reference signal resources corresponding to different radio frequency links can be implicitly indicated to the terminal. Therefore, the terminal can send different reference signals on different reference signal resources, and the network device determines, by using the different reference signals, channel quality of radio frequency links corresponding to different antenna ports, thereby implementing radio frequency link sharing, improving radio frequency link utilization, and increasing an uplink transmission rate.

With reference to the sixth aspect, in a first possible implementation of the sixth aspect, an information element IE in the first configuration information is used to indicate the first reference signal resource, or an IE in a resource type in the first configuration information is used to indicate the first reference signal resource; and an IE in the second configuration information is used to indicate the second reference signal resource, or an IE in a resource type in the second configuration information is used to indicate the second reference signal resource. There may be two possible implementations of indicating a reference signal resource.

With reference to the sixth aspect or the first possible implementation of the sixth aspect, in a second possible implementation of the sixth aspect, the receiving unit is further configured to receive third configuration information from the first network device. The third configuration information is used to indicate the terminal to send a reference signal to the first network device through both the first antenna port and the second antenna port within a first time and send a reference signal to the first network device through only the first antenna port within a second time, or the third configuration information is used to indicate the terminal to send a reference signal to the first network device through the second quantity of antenna ports within the first time and send a reference signal to the first network device through the first quantity of antenna ports within the second time. The first time and the second time are adjacent and are alternated in time domain. The terminal sends a reference signal based on the third configuration information. In this way, a second network device can schedule the terminal within the second time through protocol specification or negotiation between a network side and a terminal side, thereby avoiding a conflict caused when the first network device and the second network device schedule the terminal.

With reference to the sixth aspect, in a third possible implementation of the sixth aspect, if the first configuration information is used to indicate the third reference signal resource of the first quantity of antenna ports, and the second configuration information is used to indicate the fourth reference signal resource of the second quantity of antenna ports, the first configuration information is further used to indicate port numbers of the first quantity of antenna ports, and the second configuration information is further used to indicate port numbers of the second quantity of antenna ports. In this way, the network device can jointly perform channel state estimation based on a plurality of reference signals, thereby improving estimation precision.

With reference to any one of the sixth aspect and the first to the third possible implementations of the sixth aspect, in a fourth possible implementation of the sixth aspect, the sending unit is further configured to report an uplink communication capability of the terminal to the first network device or the second network device. The uplink communication capability of the terminal includes or indicates that an antenna capability used when the terminal sends a signal to the first network device is a first value in a first application scenario, and the antenna capability used when the terminal sends a signal to the first network device is a second value in a second application scenario. The antenna capability includes or indicates a quantity of antenna ports, a quantity of layers, a quantity of radio frequency links, a quantity of antennas, a maximum quantity of antenna ports, a maximum quantity of layers, a maximum quantity of radio frequency links, or a maximum quantity of antennas. The terminal reports the uplink communication capability of the terminal to the network device, and the network device determines, by using the uplink communication capability reported by the terminal, that the terminal supports switching from an antenna capability value to another antenna capability value. For example, when the terminal sends a signal to the first network device through the first antenna port and sends a signal to the second network device through the second antenna port, if the terminal supports switching of the antenna capability from one port to two ports, when the second antenna port is idle, the terminal may opportunistically send a signal to the first network device through both the second antenna port and the first antenna port. This can implement radio frequency link sharing or antenna port sharing, improve radio frequency link utilization or antenna port utilization, increase an uplink transmission rate, and improve a communication capability.

With reference to the sixth aspect, in the first application scenario, the terminal may send a signal to the second network device through the sending unit, and, in the second application scenario, the terminal may not send a signal to the second network device. Alternatively, in the first application scenario, the terminal may not be allowed to send a first time domain resource of a signal to the second network device, and, in the second application scenario, the terminal may not be allowed to send a second time domain resource of a signal to the second network device. It is determined that the first application scenario is a case in which the second antenna port is idle.

With reference to the sixth aspect, the sending unit may be configured to send a first message to the first network device or the second network device. The first message includes a first information element IE, and the first IE is used to indicate the uplink communication capability of the terminal. The terminal may report the communication capability.

With reference to the sixth aspect the uplink communication capability of the terminal may further include or further indicate that the antenna capability used when the terminal sends a signal to the first network device is the second value. In this case, the sending unit is further configured to send a second message to the first network device or the second network device. The second message includes a second IE and a third IE. The second IE is used to indicate that the antenna capability used when the terminal sends a signal to the first network device is the second value. The third IE is used to indicate that the antenna capability used when the terminal sends a signal to the first network device is the first value in the first application scenario, and the antenna capability used when the terminal sends a signal to the first network device is the second value in the second application scenario. The terminal may report the communication capability.

With reference to the sixth aspect, the receiving unit may be further configured to receive indication information from the first network device or the second network device. The indication information is used to indicate the terminal to enable the uplink communication capability of the terminal. In this way, the uplink communication capability of the terminal can be enabled according to a network-side indication, and a capability of the network device can be balanced.

According to a seventh aspect, a communications apparatus is provided. The apparatus may be applied to a terminal or the apparatus is the terminal. The apparatus includes a processing unit and a sending unit. The processing unit is configured to establish a connection to a first network device or a second network device. The sending unit is configured to report an uplink communication capability of the terminal to the first network device or the second network device. The uplink communication capability of the terminal includes or indicates that an antenna capability used when the terminal sends a signal to the first network device is a first value in a first application scenario, and the antenna capability used when the terminal sends a signal to the first network device is a second value in a second application scenario. The antenna capability includes or indicates a quantity of antenna ports, a quantity of layers, a quantity of radio frequency links, a quantity of antennas, a maximum quantity of antenna ports, a maximum quantity of layers, a maximum quantity of radio frequency links, or a maximum quantity of antennas. The terminal reports the uplink communication capability of the terminal to the network device, and the network device determines, by using the uplink communication capability reported by the terminal, that the terminal supports switching from an antenna capability value to another antenna capability value. For example, when the terminal sends a signal to the first network device through a first antenna port and sends a signal to the second network device through a second antenna port, if the terminal supports switching of the antenna capability from one port to two ports, when the second antenna port is idle, the terminal may opportunistically send a signal to the first network device through both the second antenna port and the first antenna port. This can implement radio frequency link sharing or antenna port sharing, improve radio frequency link utilization or antenna port utilization, increase an uplink transmission rate, and improve a communication capability.

With reference to the seventh aspect, in the first application scenario, the terminal may send a signal to the second network device, and, in the second application scenario, the terminal may not send a signal to the second network device. Alternatively, in the first application scenario, the terminal may not be allowed to send a first time domain resource of a signal to the second network device, and, in the second application scenario, the terminal may not be allowed to send a second time domain resource of a signal to the second network device. It is determined that the first application scenario is a case in which the second antenna port is idle.

With reference to the seventh aspect or the first possible implementation of the seventh aspect, in a second possible implementation of the seventh aspect, the sending unit is configured to send a first message to the first network device or the second network device. The first message includes a first information element IE, and the first IE is used to indicate the uplink communication capability of the terminal. The terminal may report the communication capability.

With reference to the seventh aspect or the first possible implementation of the seventh aspect, in a third possible implementation of the seventh aspect, the uplink communication capability of the terminal further includes or further indicates that the antenna capability used when the terminal sends a signal to the first network device is the second value. In this case, the sending unit is configured to send a second message to the first network device or the second network device. The second message includes a second IE and a third IE. The second IE is used to indicate that the antenna capability used when the terminal sends a signal to the first network device is the second value. The third IE is used to indicate that the antenna capability used when the terminal sends a signal to the first network device is the first value in the first application scenario, and the antenna capability used when the terminal sends a signal to the first network device is the second value in the second application scenario. The terminal may report the communication capability.

With reference to any one of the seventh aspect and the first to the third possible implementations of the seventh aspect, in a fourth possible implementation of the seventh aspect, the apparatus further includes a receiving unit, and the receiving unit is configured to receive indication information from the first network device or the second network device. The indication information is used to indicate the terminal to enable the uplink communication capability of the terminal. In this way, the uplink communication capability of the terminal can be enabled according to a network-side indication, and a capability of the network device can be balanced.

With reference to any one of the seventh aspect and the first to the fourth possible implementations of the seventh aspect, in a fifth possible implementation of the seventh aspect, the receiving unit is further configured to receive first configuration information and second configuration information from the first network device. The first configuration information is used to indicate a first reference signal resource of the first antenna port, and the second configuration information is used to indicate a second reference signal resource of the second antenna port; or the first configuration information is used to indicate a third reference signal resource of a first quantity of antenna ports, and the second configuration information is used to indicate a fourth reference signal resource of a second quantity of antenna ports. The receiving unit is further configured to: send a first reference signal based on the first configuration information and send a second reference signal based on the second configuration information. In this way, different reference signal resources are configured for different antenna ports, so that the terminal can send different reference signals on the different reference signal resources, and the network device determines, by using the different reference signals, channel quality of radio frequency links corresponding to the different antenna ports, thereby implementing radio frequency link sharing, improving radio frequency link utilization, and increasing an uplink transmission rate. Alternatively, different reference signal resources are configured for different quantities of antenna ports, so that reference signal resources corresponding to different radio frequency links can be implicitly indicated to the terminal. Therefore, the terminal can send different reference signals on different reference signal resources, and the network device determines, by using the different reference signals, channel quality of radio frequency links corresponding to different antenna ports, thereby implementing radio frequency link sharing, improving radio frequency link utilization, and increasing an uplink transmission rate.

With reference to the fifth possible implementation of the seventh aspect, in a sixth possible implementation of the seventh aspect, an information element IE in the first configuration information is used to indicate the first reference signal resource, or an IE in a resource type in the first configuration information is used to indicate the first reference signal resource; and an IE in the second configuration information is used to indicate the second reference signal resource, or an IE in a resource type in the second configuration information is used to indicate the second reference signal resource. There may be two possible implementations of indicating a reference signal resource.

With reference to the fifth possible implementation of the seventh aspect or the sixth possible implementation of the seventh aspect, in a seventh possible implementation of the seventh aspect, the receiving unit is further configured to receive third configuration information from the first network device. The third configuration information is used to indicate the terminal to send a reference signal to the first network device through both the first antenna port and the second antenna port within a first time and send a reference signal to the first network device through only the first antenna port within a second time, or the third configuration information is used to indicate the terminal to send a reference signal to the first network device through the second quantity of antenna ports within the first time and send a reference signal to the first network device through the first quantity of antenna ports within the second time. The first time and the second time are adjacent and are alternated in time domain. The terminal sends a reference signal based on the third configuration information. In this way, the second network device can schedule the terminal within the second time through protocol specification or negotiation between a network side and a terminal side, thereby avoiding a conflict caused when the first network device and the second network device schedule the terminal.

With reference to the fifth possible implementation of the seventh aspect, in an eighth possible implementation of the seventh aspect, if the first configuration information is used to indicate the third reference signal resource of the first quantity of antenna ports, and the second configuration information is used to indicate the fourth reference signal resource of the second quantity of antenna ports, the first configuration information is further used to indicate port numbers of the first quantity of antenna ports, and the second configuration information is further used to indicate port numbers of the second quantity of antenna ports. In this way, the network device can jointly perform channel state estimation based on a plurality of reference signals, thereby improving estimation precision.

According to an eighth aspect, a communications apparatus is provided. The apparatus may be applied to a terminal or the apparatus is the terminal. The apparatus includes a sending unit. The sending unit is configured to: in a first application scenario, communicate with a first network device over a first radio frequency link, and communicate with a second network device over a second radio frequency link. The sending unit is further configured to: in a second application scenario, communicate with the first network device over the first radio frequency link and the second radio frequency link. This can implement radio frequency link sharing or antenna port sharing, improve radio frequency link utilization or antenna port utilization, increase an uplink transmission rate, and improve a communication capability.

With reference to the eighth aspect, in a first possible implementation of the eighth aspect, the first application scenario is that the sending unit sends a signal to the second network device, and the second application scenario is that the sending unit does not send a signal to the second network device; or the first application scenario is that the sending unit is allowed to send a first time domain resource of a signal to the second network device, and the second application scenario is that the sending unit is not allowed to send a second time domain resource of a signal to the second network device. It is determined that the first application scenario is a case in which a second antenna port is idle.

With reference to the eighth aspect or the first possible implementation of the eighth aspect, in a second possible implementation of the eighth aspect, in the first application scenario, the sending unit is configured to: communicate with the first network device on a first frequency domain resource over the first radio frequency link, and communicate with the second network device on a second frequency domain resource over the second radio frequency link. In the second application scenario, the sending unit is configured to communicate with the first network device on the first frequency domain resource over the first radio frequency link and the second radio frequency link.

With reference to any one of the eighth aspect and the first and the second possible implementations of the eighth aspect, in a third possible implementation of the eighth aspect, the first time domain resource is a subframe, a slot, or a symbol, and the second time domain resource is a subframe, a slot, or a symbol.

With reference to any one of the eighth aspect and the first to the third possible implementations of the eighth aspect, in a fourth possible implementation of the eighth aspect, the apparatus further includes a receiving unit, and the receiving unit is configured to receive first configuration information and second configuration information from the first network device. The first configuration information is used to indicate a first reference signal resource of a first antenna port, and the second configuration information is used to indicate a second reference signal resource of a second antenna port; or the first configuration information is used to indicate a third reference signal resource of a first quantity of antenna ports, and the second configuration information is used to indicate a fourth reference signal resource of a second quantity of antenna ports. The sending unit is further configured to: send a first reference signal based on the first configuration information and send a second reference signal based on the second configuration information. In this way, different reference signal resources are configured for different antenna ports, so that the terminal can send different reference signals on the different reference signal resources, and the network device determines, by using the different reference signals, channel quality of radio frequency links corresponding to the different antenna ports, thereby implementing radio frequency link sharing, improving radio frequency link utilization, and increasing an uplink transmission rate. Alternatively, different reference signal resources are configured for different quantities of antenna ports, so that reference signal resources corresponding to different radio frequency links can be implicitly indicated to the terminal. Therefore, the terminal can send different reference signals on different reference signal resources, and the network device determines, by using the different reference signals, channel quality of radio frequency links corresponding to different antenna ports, thereby implementing radio frequency link sharing, improving radio frequency link utilization, and increasing an uplink transmission rate.

With reference to the fourth possible implementation of the eighth aspect, in a fifth possible implementation of the eighth aspect, an information element IE in the first configuration information is used to indicate the first reference signal resource, or an IE in a resource type in the first configuration information is used to indicate the first reference signal resource; and an IE in the second configuration information is used to indicate the second reference signal resource, or an IE in a resource type in the second configuration information is used to indicate the second reference signal resource. There may be two possible implementations of indicating a reference signal resource.

With reference to the fourth or the fifth possible implementation of the eighth aspect, in a sixth possible implementation of the eighth aspect, the receiving unit is further configured to receive third configuration information from the first network device. The third configuration information is used to indicate the terminal to send a reference signal to the first network device through both the first antenna port and the second antenna port within a first time and send a reference signal to the first network device through only the first antenna port within a second time, or the third configuration information is used to indicate the sending unit to send a reference signal to the first network device through the second quantity of antenna ports within the first time and send a reference signal to the first network device through the first quantity of antenna ports within the second time. The first time and the second time are adjacent and are alternated in time domain. The sending unit is further configured to send a reference signal based on the third configuration information. In this way, the second network device can schedule the terminal within the second time through protocol specification or negotiation between a network side and a terminal side, thereby avoiding a conflict caused when the first network device and the second network device schedule the terminal.

With reference to the fourth possible implementation of the eighth aspect, in a seventh possible implementation of the eighth aspect, if the first configuration information is used to indicate the third reference signal resource of the first quantity of antenna ports, and the second configuration information is used to indicate the fourth reference signal resource of the second quantity of antenna ports, the first configuration information is further used to indicate port numbers of the first quantity of antenna ports, and the second configuration information is further used to indicate port numbers of the second quantity of antenna ports. In this way, the network device can jointly perform channel state estimation based on a plurality of reference signals, thereby improving estimation precision.

With reference to any one of the eighth aspect and the first to the seventh possible implementations of the eighth aspect, in an eighth possible implementation of the eighth aspect, the sending unit is further configured to report an uplink communication capability of the terminal to the first network device or the second network device. The uplink communication capability of the terminal includes or indicates that an antenna capability used when the terminal sends a signal to the first network device is a first value in the first application scenario, and the antenna capability used when the terminal sends a signal to the first network device is a second value in the second application scenario. The antenna capability includes or indicates a quantity of antenna ports, a quantity of layers, a quantity of radio frequency links, a quantity of antennas, a maximum quantity of antenna ports, a maximum quantity of layers, a maximum quantity of radio frequency links, or a maximum quantity of antennas. The terminal reports the uplink communication capability of the terminal to the network device, and the network device determines, by using the uplink communication capability reported by the terminal, that the terminal supports switching from an antenna capability value to another antenna capability value. For example, when the terminal sends a signal to the first network device through the first antenna port and sends a signal to the second network device through the second antenna port, if the terminal supports switching of the antenna capability from one port to two ports, when the second antenna port is idle, the terminal may opportunistically send a signal to the first network device through both the second antenna port and the first antenna port. This can implement radio frequency link sharing or antenna port sharing, improve radio frequency link utilization or antenna port utilization, increase an uplink transmission rate, and improve a communication capability.

With reference to the eighth possible implementation of the eighth aspect, in a ninth possible implementation of the eighth aspect, the sending unit is configured to report the uplink communication capability of the terminal to the first network device or the second network device in the following manner: The sending unit sends a first message to the first network device or the second network device. The first message includes a first information element IE, and the first IE is used to indicate the uplink communication capability of the terminal. The terminal may report the communication capability.

With reference to the eighth possible implementation of the eighth aspect, in a tenth possible implementation of the eighth aspect, the uplink communication capability of the terminal further includes or further indicates that the antenna capability used when the terminal sends a signal to the first network device is the second value. In this case, the terminal sends a second message to the first network device or the second network device. The second message includes a second IE and a third IE. The second IE is used to indicate that the antenna capability used when the terminal sends a signal to the first network device is the second value. The third IE is used to indicate that the antenna capability used when the terminal sends a signal to the first network device is the first value in the first application scenario, and the antenna capability used when the terminal sends a signal to the first network device is the second value in the second application scenario. The terminal may report the communication capability.

With reference to any one of the eighth aspect and the first to the tenth possible implementations of the eighth aspect, in an eleventh possible implementation of the eighth aspect, the receiving unit is further configured to receive indication information from the first network device or the second network device. The indication information is used to indicate the terminal to enable the uplink communication capability of the terminal. In this way, the uplink communication capability of the terminal can be enabled according to a network-side indication, and a capability of the network device can be balanced.

According to a ninth aspect, a communications apparatus is provided. The apparatus may be applied to a network device or the apparatus is the network device, denoted as a first network device. The apparatus includes a sending unit and a receiving unit. The sending unit is configured to send first configuration information and second configuration information to a terminal. The first configuration information is used to indicate a first reference signal resource of a first antenna port, and the second configuration information is used to indicate a second reference signal resource of a second antenna port; or the first configuration information is used to indicate a third reference signal resource of a first quantity of antenna ports, and the second configuration information is used to indicate a fourth reference signal resource of a second quantity of antenna ports. The receiving unit is configured to receive a first reference signal and a second reference signal that are sent by the terminal. In this way, different reference signal resources are configured for different antenna ports, so that the terminal can send different reference signals on the different reference signal resources, and the network device determines, by using the different reference signals, channel quality of radio frequency links corresponding to the different antenna ports, thereby implementing radio frequency link sharing, improving radio frequency link utilization, and increasing an uplink transmission rate. Alternatively, different reference signal resources are configured for different quantities of antenna ports, so that reference signal resources corresponding to different radio frequency links can be implicitly indicated to the terminal. Therefore, the terminal can send different reference signals on different reference signal resources, and the network device determines, by using the different reference signals, channel quality of radio frequency links corresponding to different antenna ports, thereby implementing radio frequency link sharing, improving radio frequency link utilization, and increasing an uplink transmission rate.

With reference to the ninth aspect, in a first possible implementation of the ninth aspect, an information element IE in the first configuration information is used to indicate the first reference signal resource, or an IE in a resource type in the first configuration information is used to indicate the first reference signal resource; and an IE in the second configuration information is used to indicate the second reference signal resource, or an IE in a resource type in the second configuration information is used to indicate the second reference signal resource. There may be two possible implementations of indicating a reference signal resource.

With reference to the ninth aspect or the first possible implementation of the ninth aspect, in a second possible implementation of the ninth aspect, the sending unit is further configured to send third configuration information to the terminal. The third configuration information is used to indicate the terminal to send a reference signal to the first network device through both the first antenna port and the second antenna port within a first time and send a reference signal to the first network device through only the first antenna port within a second time, or the third configuration information is used to indicate the terminal to send a reference signal to the first network device through the second quantity of antenna ports within the first time and send a reference signal to the first network device through the first quantity of antenna ports within the second time. The first time and the second time are adjacent and are alternated in time domain. In this way, a second network device can schedule the terminal within the second time through protocol specification or negotiation between a network side and a terminal side, thereby avoiding a conflict caused when the first network device and the second network device schedule the terminal.

With reference to the ninth aspect, in a third possible implementation of the ninth aspect, if the first configuration information is used to indicate the third reference signal resource of the first quantity of antenna ports, and the second configuration information is used to indicate the fourth reference signal resource of the second quantity of antenna ports, the first configuration information is further used to indicate port numbers of the first quantity of antenna ports, and the second configuration information is further used to indicate port numbers of the second quantity of antenna ports.

With reference to any one of the ninth aspect and the first to the third possible implementations of the ninth aspect, in a fourth possible implementation of the ninth aspect, the receiving unit is further configured to receive an uplink communication capability of the terminal that is reported by the terminal. The uplink communication capability of the terminal includes or indicates that an antenna capability used when the terminal sends a signal to the first network device is a first value in a first application scenario, and the antenna capability used when the terminal sends a signal to the first network device is a second value in a second application scenario. The antenna capability includes or indicates a quantity of antenna ports, a quantity of layers, a quantity of radio frequency links, a quantity of antennas, a maximum quantity of antenna ports, a maximum quantity of layers, a maximum quantity of radio frequency links, or a maximum quantity of antennas. The terminal reports the uplink communication capability of the terminal to the network device, and the network device determines, by using the uplink communication capability reported by the terminal, that the terminal supports switching from an antenna capability value to another antenna capability value. For example, when the terminal sends a signal to the first network device through the first antenna port and sends a signal to the second network device through the second antenna port, if the terminal supports switching of the antenna capability from one port to two ports, when the second antenna port is idle, the terminal may opportunistically send a signal to the first network device through both the second antenna port and the first antenna port. This can implement radio frequency link sharing or antenna port sharing, improve radio frequency link utilization or antenna port utilization, increase an uplink transmission rate, and improve a communication capability.

With reference to the ninth aspect, in the first application scenario, the terminal may send a signal to the second network device, and, in the second application scenario, the terminal may not send a signal to the second network device. Alternatively, in the first application scenario, the terminal may not be allowed to send a first time domain resource of a signal to the second network device, and, in the second application scenario, the terminal may not be allowed to send a second time domain resource of a signal to the second network device.

With reference to the ninth aspect, the sending unit may be further configured to send indication information to the terminal. The indication information is used to indicate the terminal to enable the uplink communication capability of the terminal. In this way, the uplink communication capability of the terminal can be enabled according to a network-side indication, and a capability of the network device can be balanced.

According to a tenth aspect, a communications apparatus is provided. The apparatus may be applied to a terminal or the apparatus is the terminal. The apparatus includes a receiving unit and a sending unit. The receiving unit is configured to receive configuration information from a network device. The configuration information is used to indicate a port number and a reference signal resource that are used by the terminal to send a reference signal to the network device. The sending unit is configured to send the reference signal to the network device on the reference signal resource based on the configuration information by using the port number. By using a configured port number used for signal sending, the terminal can determine an antenna port and can estimate a channel status corresponding to the antenna port.

According to an eleventh aspect, a communications apparatus is provided. The apparatus may be applied to a terminal. The apparatus includes a transceiver and a processor. The processor is configured to: be coupled to a memory, invoke a program in the memory, and execute the program to implement the following steps: receiving first configuration information and second configuration information from a first network device through the transceiver, where the first configuration information is used to indicate a first reference signal resource of a first antenna port, and the second configuration information is used to indicate a second reference signal resource of a second antenna port; or the first configuration information is used to indicate a third reference signal resource of a first quantity of antenna ports, and the second configuration information is used to indicate a fourth reference signal resource of a second quantity of antenna ports; and sending a first reference signal based on the first configuration information through the transceiver, and sending a second reference signal based on the second configuration information through the transceiver. In this way, different reference signal resources are configured for different antenna ports, so that the terminal can send different reference signals on the different reference signal resources, and the network device determines, by using the different reference signals, channel quality of radio frequency links corresponding to the different antenna ports, thereby implementing radio frequency link sharing, improving radio frequency link utilization, and increasing an uplink transmission rate. Alternatively, different reference signal resources are configured for different quantities of antenna ports, so that reference signal resources corresponding to different radio frequency links can be implicitly indicated to the terminal. Therefore, the terminal can send different reference signals on different reference signal resources, and the network device determines, by using the different reference signals, channel quality of radio frequency links corresponding to different antenna ports, thereby implementing radio frequency link sharing, improving radio frequency link utilization, and increasing an uplink transmission rate.

With reference to the eleventh aspect, in a first possible implementation of the eleventh aspect, an information element IE in the first configuration information is used to indicate the first reference signal resource, or an IE in a resource type in the first configuration information is used to indicate the first reference signal resource; and an IE in the second configuration information is used to indicate the second reference signal resource, or an IE in a resource type in the second configuration information is used to indicate the second reference signal resource. There may be two possible implementations of indicating a reference signal resource.

With reference to the eleventh aspect or the first possible implementation of the eleventh aspect, in a second possible implementation of the eleventh aspect, the processor is further configured to receive third configuration information from the first network device through the transceiver. The third configuration information is used to indicate the terminal to send a reference signal to the first network device through both the first antenna port and the second antenna port within a first time and send a reference signal to the first network device through only the first antenna port within a second time, or the third configuration information is used to indicate the terminal to send a reference signal to the first network device through the second quantity of antenna ports within the first time and send a reference signal to the first network device through the first quantity of antenna ports within the second time. The first time and the second time are adjacent and are alternated in time domain. The terminal sends a reference signal based on the third configuration information. In this way, a second network device can schedule the terminal within the second time through protocol specification or negotiation between a network side and a terminal side, thereby avoiding a conflict caused when the first network device and the second network device schedule the terminal.

With reference to the eleventh aspect, in a third possible implementation of the eleventh aspect, if the first configuration information is used to indicate the third reference signal resource of the first quantity of antenna ports, and the second configuration information is used to indicate the fourth reference signal resource of the second quantity of antenna ports, the first configuration information is further used to indicate port numbers of the first quantity of antenna ports, and the second configuration information is further used to indicate port numbers of the second quantity of antenna ports. In this way, the network device can jointly perform channel state estimation based on a plurality of reference signals, thereby improving estimation precision.

With reference to any one of the eleventh aspect and the first to the third possible implementations of the eleventh aspect, in a fourth possible implementation of the eleventh aspect, the processor is further configured to report an uplink communication capability of the terminal to the first network device or the second network device through the transceiver. The uplink communication capability of the terminal includes or indicates that an antenna capability used when the terminal sends a signal to the first network device is a first value in a first application scenario, and the antenna capability used when the terminal sends a signal to the first network device is a second value in a second application scenario. The antenna capability includes or indicates a quantity of antenna ports, a quantity of layers, a quantity of radio frequency links, a quantity of antennas, a maximum quantity of antenna ports, a maximum quantity of layers, a maximum quantity of radio frequency links, or a maximum quantity of antennas. The terminal reports the uplink communication capability of the terminal to the network device, and the network device determines, by using the uplink communication capability reported by the terminal, that the terminal supports switching from an antenna capability value to another antenna capability value. For example, when the terminal sends a signal to the first network device through the first antenna port and sends a signal to the second network device through the second antenna port, if the terminal supports switching of the antenna capability from one port to two ports, when the second antenna port is idle, the terminal may opportunistically send a signal to the first network device through both the second antenna port and the first antenna port. This can implement radio frequency link sharing or antenna port sharing, improve radio frequency link utilization or antenna port utilization, increase an uplink transmission rate, and improve a communication capability.

With reference to the eleventh aspect, in the first application scenario, the terminal may send a signal to the second network device through the sending unit, and, in the second application scenario, the terminal may not send a signal to the second network device. Alternatively, in the first application scenario, the terminal may not be allowed to send a first time domain resource of a signal to the second network device, and, in the second application scenario, the terminal may not be allowed to send a second time domain resource of a signal to the second network device. It is determined that the first application scenario is a case in which the second antenna port is idle.

With reference to the eleventh aspect, the processor may be further configured to send a first message to the first network device or the second network device through the transceiver. The first message includes a first information element IE, and the first IE is used to indicate the uplink communication capability of the terminal. The terminal may report the communication capability.

With reference to the eleventh aspect, the uplink communication capability of the terminal may further include or further indicate that the antenna capability used when the terminal sends a signal to the first network device is the second value. In this case, the processor is further configured to send a second message to the first network device or the second network device through the transceiver. The second message includes a second IE and a third IE. The second IE is used to indicate that the antenna capability used when the terminal sends a signal to the first network device is the second value. The third IE is used to indicate that the antenna capability used when the terminal sends a signal to the first network device is the first value in the first application scenario, and the antenna capability used when the terminal sends a signal to the first network device is the second value in the second application scenario. The terminal may report the communication capability.

With reference to the eleventh aspect, the processor may be further configured to receive indication information from the first network device or the second network device through the transceiver. The indication information is used to indicate the terminal to enable the uplink communication capability of the terminal. In this way, the uplink communication capability of the terminal can be enabled according to a network-side indication, and a capability of the network device can be balanced.

According to a twelfth aspect, a communications apparatus is provided. The apparatus may be applied to a terminal or the apparatus is the terminal. The apparatus includes a processor and a transceiver. The processor is configured to: couple to a memory, invoke a program in the memory, and execute the program to implement the following step: establishing a connection to a first network device or a second network device. The transceiver is configured to report an uplink communication capability of the terminal to the first network device or the second network device. The uplink communication capability of the terminal includes or indicates that an antenna capability used when the terminal sends a signal to the first network device is a first value in a first application scenario, and the antenna capability used when the terminal sends a signal to the first network device is a second value in a second application scenario. The antenna capability includes or indicates a quantity of antenna ports, a quantity of layers, a quantity of radio frequency links, a quantity of antennas, a maximum quantity of antenna ports, a maximum quantity of layers, a maximum quantity of radio frequency links, or a maximum quantity of antennas. The terminal reports the uplink communication capability of the terminal to the network device, and the network device determines, by using the uplink communication capability reported by the terminal, that the terminal supports switching from an antenna capability value to another antenna capability value. For example, when the terminal sends a signal to the first network device through a first antenna port and sends a signal to the second network device through a second antenna port, if the terminal supports switching of the antenna capability from one port to two ports, when the second antenna port is idle, the terminal may opportunistically send a signal to the first network device through both the second antenna port and the first antenna port. This can implement radio frequency link sharing or antenna port sharing, improve radio frequency link utilization or antenna port utilization, increase an uplink transmission rate, and improve a communication capability.

With reference to the twelfth aspect, in the first application scenario, the terminal may send a signal to the second network device, and, in the second application scenario, the terminal may not send a signal to the second network device. Alternatively, in the first application scenario, the terminal may be allowed to send a first time domain resource of a signal to the second network device, and, in the second application scenario, the terminal may not be allowed to send a second time domain resource of a signal to the second network device. It is determined that the first application scenario is a case in which the second antenna port is idle.

With reference to the twelfth aspect or the first possible implementation of the twelfth aspect, in a second possible implementation of the twelfth aspect, the transceiver is configured to send a first message to the first network device or the second network device. The first message includes a first information element IE, and the first IE is used to indicate the uplink communication capability of the terminal. The terminal may report the communication capability.

With reference to the twelfth aspect or the first possible implementation of the twelfth aspect, in a third possible implementation of the twelfth aspect, the uplink communication capability of the terminal further includes or further indicates that the antenna capability used when the terminal sends a signal to the first network device is the second value. In this case, the transceiver is configured to send a second message to the first network device or the second network device. The second message includes a second IE and a third IE. The second IE is used to indicate that the antenna capability used when the terminal sends a signal to the first network device is the second value. The third IE is used to indicate that the antenna capability used when the terminal sends a signal to the first network device is the first value in the first application scenario, and the antenna capability used when the terminal sends a signal to the first network device is the second value in the second application scenario. The terminal may report the communication capability.

With reference to any one of the twelfth aspect and the first to the third possible implementations of the twelfth aspect, in a fourth possible implementation of the twelfth aspect, the apparatus further includes a receiving unit, and the transceiver is configured to receive indication information from the first network device or the second network device. The indication information is used to indicate the terminal to enable the uplink communication capability of the terminal. In this way, the uplink communication capability of the terminal can be enabled according to a network-side indication, and a capability of the network device can be balanced.

With reference to any one of the twelfth aspect and the first to the fourth possible implementations of the twelfth aspect, in a fifth possible implementation of the twelfth aspect, the transceiver is further configured to receive first configuration information and second configuration information from the first network device. The first configuration information is used to indicate a first reference signal resource of the first antenna port, and the second configuration information is used to indicate a second reference signal resource of the second antenna port; or the first configuration information is used to indicate a third reference signal resource of a first quantity of antenna ports, and the second configuration information is used to indicate a fourth reference signal resource of a second quantity of antenna ports. The transceiver is further configured to: send a first reference signal based on the first configuration information and send a second reference signal based on the second configuration information. In this way, different reference signal resources are configured for different antenna ports, so that the terminal can send different reference signals on the different reference signal resources, and the network device determines, by using the different reference signals, channel quality of radio frequency links corresponding to the different antenna ports, thereby implementing radio frequency link sharing, improving radio frequency link utilization, and increasing an uplink transmission rate. Alternatively, different reference signal resources are configured for different quantities of antenna ports, so that reference signal resources corresponding to different radio frequency links can be implicitly indicated to the terminal. Therefore, the terminal can send different reference signals on different reference signal resources, and the network device determines, by using the different reference signals, channel quality of radio frequency links corresponding to different antenna ports, thereby implementing radio frequency link sharing, improving radio frequency link utilization, and increasing an uplink transmission rate.

With reference to the fifth possible implementation of the twelfth aspect, in a sixth possible implementation of the twelfth aspect, an information element IE in the first configuration information is used to indicate the first reference signal resource, or an IE in a resource type in the first configuration information is used to indicate the first reference signal resource; and an IE in the second configuration information is used to indicate the second reference signal resource, or an IE in a resource type in the second configuration information is used to indicate the second reference signal resource. There may be two possible implementations of indicating a reference signal resource.

With reference to the fifth possible implementation of the twelfth aspect or the sixth possible implementation of the twelfth aspect, in a seventh possible implementation of the twelfth aspect, the transceiver is further configured to receive third configuration information from the first network device. The third configuration information is used to indicate the terminal to send a reference signal to the first network device through both the first antenna port and the second antenna port within a first time and send a reference signal to the first network device through only the first antenna port within a second time, or the third configuration information is used to indicate the terminal to send a reference signal to the first network device through the second quantity of antenna ports within the first time and send a reference signal to the first network device through the first quantity of antenna ports within the second time. The first time and the second time are adjacent and are alternated in time domain. The terminal sends a reference signal based on the third configuration information. In this way, the second network device can schedule the terminal within the second time through protocol specification or negotiation between a network side and a terminal side, thereby avoiding a conflict caused when the first network device and the second network device schedule the terminal.

With reference to the fifth possible implementation of the twelfth aspect, in an eighth possible implementation of the twelfth aspect, if the first configuration information is used to indicate the third reference signal resource of the first quantity of antenna ports, and the second configuration information is used to indicate the fourth reference signal resource of the second quantity of antenna ports, the first configuration information is further used to indicate port numbers of the first quantity of antenna ports, and the second configuration information is further used to indicate port numbers of the second quantity of antenna ports. In this way, the network device can jointly perform channel state estimation based on a plurality of reference signals, thereby improving estimation precision.

According to a thirteenth aspect, a communications apparatus is provided. The apparatus may be applied to a terminal or the apparatus is the terminal. The apparatus includes a processor and a transceiver. The processor is configured to: couple to a memory, invoke a program in the memory, and execute the program to implement the following steps: in a first application scenario, communicating with a first network device over a first radio frequency link through the transceiver, and communicating with a second network device over a second radio frequency link through the transceiver. The sending unit is further configured to: in a second application scenario, communicate with the first network device over the first radio frequency link and the second radio frequency link. This can implement radio frequency link sharing or antenna port sharing, improve radio frequency link utilization or antenna port utilization, increase an uplink transmission rate, and improve a communication capability.

With reference to the thirteenth aspect, in a first possible implementation of the thirteenth aspect, the first application scenario is that the sending unit sends a signal to the second network device, and the second application scenario is that the transceiver does not send a signal to the second network device; or the first application scenario is that the transceiver is allowed to send a first time domain resource of a signal to the second network device, and the second application scenario is that the sending unit is not allowed to send a second time domain resource of a signal to the second network device. It is determined that the first application scenario is a case in which a second antenna port is idle.

With reference to the thirteenth aspect or the first possible implementation of the thirteenth aspect, in a second possible implementation of the thirteenth aspect, the processor is further configured to: in the first application scenario, communicate with the first network device on a first frequency domain resource over the first radio frequency link through the transceiver, and communicate with the second network device on a second frequency domain resource over the second radio frequency link through the transceiver; and in the second application scenario, communicate with the first network device on the first frequency domain resource over the first radio frequency link and the second radio frequency link through the transceiver.

With reference to any one of the thirteenth aspect and the first and the second possible implementations of the thirteenth aspect, in a third possible implementation of the thirteenth aspect, the first time domain resource is a subframe, a slot, or a symbol, and the second time domain resource is a subframe, a slot, or a symbol.

With reference to any one of the thirteenth aspect and the first to the third possible implementations of the thirteenth aspect, in a fourth possible implementation of the thirteenth aspect, the transceiver is further configured to receive first configuration information and second configuration information from the first network device. The first configuration information is used to indicate a first reference signal resource of a first antenna port, and the second configuration information is used to indicate a second reference signal resource of a second antenna port; or the first configuration information is used to indicate a third reference signal resource of a first quantity of antenna ports, and the second configuration information is used to indicate a fourth reference signal resource of a second quantity of antenna ports. The transceiver is further configured to: send a first reference signal based on the first configuration information and send a second reference signal based on the second configuration information. In this way, different reference signal resources are configured for different antenna ports, so that the terminal can send different reference signals on the different reference signal resources, and the network device determines, by using the different reference signals, channel quality of radio frequency links corresponding to the different antenna ports, thereby implementing radio frequency link sharing, improving radio frequency link utilization, and increasing an uplink transmission rate. Alternatively, different reference signal resources are configured for different quantities of antenna ports, so that reference signal resources corresponding to different radio frequency links can be implicitly indicated to the terminal. Therefore, the terminal can send different reference signals on different reference signal resources, and the network device determines, by using the different reference signals, channel quality of radio frequency links corresponding to different antenna ports, thereby implementing radio frequency link sharing, improving radio frequency link utilization, and increasing an uplink transmission rate.

With reference to the fourth possible implementation of the thirteenth aspect, in a fifth possible implementation of the thirteenth aspect, an information element IE in the first configuration information is used to indicate the first reference signal resource, or an IE in a resource type in the first configuration information is used to indicate the first reference signal resource; and an IE in the second configuration information is used to indicate the second reference signal resource, or an IE in a resource type in the second configuration information is used to indicate the second reference signal resource. There may be two possible implementations of indicating a reference signal resource.

With reference to the fourth or the fifth possible implementation of the thirteenth aspect, in a sixth possible implementation of the thirteenth aspect, the transceiver is further configured to receive third configuration information from the first network device. The third configuration information is used to indicate the terminal to send a reference signal to the first network device through both the first antenna port and the second antenna port within a first time and send a reference signal to the first network device through only the first antenna port within a second time, or the third configuration information is used to indicate the sending unit to send a reference signal to the first network device through the second quantity of antenna ports within the first time and send a reference signal to the first network device through the first quantity of antenna ports within the second time. The first time and the second time are adjacent and are alternated in time domain. The sending unit is further configured to send a reference signal based on the third configuration information. In this way, the second network device can schedule the terminal within the second time through protocol specification or negotiation between a network side and a terminal side, thereby avoiding a conflict caused when the first network device and the second network device schedule the terminal.

With reference to the fourth possible implementation of the thirteenth aspect, in a seventh possible implementation of the thirteenth aspect, if the first configuration information is used to indicate the third reference signal resource of the first quantity of antenna ports, and the second configuration information is used to indicate the fourth reference signal resource of the second quantity of antenna ports, the first configuration information is further used to indicate port numbers of the first quantity of antenna ports, and the second configuration information is further used to indicate port numbers of the second quantity of antenna ports. In this way, the network device can jointly perform channel state estimation based on a plurality of reference signals, thereby improving estimation precision.

With reference to any one of the thirteenth aspect and the first to the seventh possible implementations of the thirteenth aspect, in an eighth possible implementation of the thirteenth aspect, the transceiver is further configured to report an uplink communication capability of the terminal to the first network device or the second network device. The uplink communication capability of the terminal includes or indicates that an antenna capability used when the terminal sends a signal to the first network device is a first value in the first application scenario, and the antenna capability used when the terminal sends a signal to the first network device is a second value in the second application scenario. The antenna capability includes or indicates a quantity of antenna ports, a quantity of layers, a quantity of radio frequency links, a quantity of antennas, a maximum quantity of antenna ports, a maximum quantity of layers, a maximum quantity of radio frequency links, or a maximum quantity of antennas. The terminal reports the uplink communication capability of the terminal to the network device, and the network device determines, by using the uplink communication capability reported by the terminal, that the terminal supports switching from an antenna capability value to another antenna capability value. For example, when the terminal sends a signal to the first network device through the first antenna port and sends a signal to the second network device through the second antenna port, if the terminal supports switching of the antenna capability from one port to two ports, when the second antenna port is idle, the terminal may opportunistically send a signal to the first network device through both the second antenna port and the first antenna port. This can implement radio frequency link sharing or antenna port sharing, improve radio frequency link utilization or antenna port utilization, increase an uplink transmission rate, and improve a communication capability.

With reference to the eighth possible implementation of the thirteenth aspect, in a ninth possible implementation of the thirteenth aspect, the transceiver reports the uplink communication capability of the terminal to the first network device or the second network device in the following manner: The transceiver sends a first message to the first network device or the second network device. The first message includes a first information element IE, and the first IE is used to indicate the uplink communication capability of the terminal. The terminal may report the communication capability.

With reference to the eighth possible implementation of the thirteenth aspect, in a tenth possible implementation of the thirteenth aspect, the uplink communication capability of the terminal further includes or further indicates that the antenna capability used when the terminal sends a signal to the first network device is the second value. In this case, the terminal sends a second message to the first network device or the second network device. The second message includes a second IE and a third IE. The second IE is used to indicate that the antenna capability used when the terminal sends a signal to the first network device is the second value. The third IE is used to indicate that the antenna capability used when the terminal sends a signal to the first network device is the first value in the first application scenario, and the antenna capability used when the terminal sends a signal to the first network device is the second value in the second application scenario. The terminal may report the communication capability.

With reference to any one of the thirteenth aspect and the first to the tenth possible implementations of the thirteenth aspect, in an eleventh possible implementation of the thirteenth aspect, the transceiver is further configured to receive indication information from the first network device or the second network device. The indication information is used to indicate the terminal to enable the uplink communication capability of the terminal. In this way, the uplink communication capability of the terminal can be enabled according to a network-side indication, and a capability of the network device can be balanced.

According to a fourteenth aspect, a communications apparatus is provided. The apparatus may be applied to a network device or the apparatus is the network device, denoted as a first network device. The apparatus includes a processor and a transceiver. The processor is configured to: couple to a memory, invoke a program in the memory, and execute the program to implement the following steps: sending first configuration information and second configuration information to a terminal through the transceiver, where the first configuration information is used to indicate a first reference signal resource of a first antenna port, and the second configuration information is used to indicate a second reference signal resource of a second antenna port; or the first configuration information is used to indicate a third reference signal resource of a first quantity of antenna ports, and the second configuration information is used to indicate a fourth reference signal resource of a second quantity of antenna ports; and receiving, through the transceiver, a first reference signal and a second reference signal that are sent by the terminal. In this way, different reference signal resources are configured for different antenna ports, so that the terminal can send different reference signals on the different reference signal resources, and the network device determines, by using the different reference signals, channel quality of radio frequency links corresponding to the different antenna ports, thereby implementing radio frequency link sharing, improving radio frequency link utilization, and increasing an uplink transmission rate. Alternatively, different reference signal resources are configured for different quantities of antenna ports, so that reference signal resources corresponding to different radio frequency links can be implicitly indicated to the terminal. Therefore, the terminal can send different reference signals on different reference signal resources, and the network device determines, by using the different reference signals, channel quality of radio frequency links corresponding to different antenna ports, thereby implementing radio frequency link sharing, improving radio frequency link utilization, and increasing an uplink transmission rate.

With reference to the fourteenth aspect, in a first possible implementation of the fourteenth aspect, an information element IE in the first configuration information is used to indicate the first reference signal resource, or an IE in a resource type in the first configuration information is used to indicate the first reference signal resource; and an IE in the second configuration information is used to indicate the second reference signal resource, or an IE in a resource type in the second configuration information is used to indicate the second reference signal resource. There may be two possible implementations of indicating a reference signal resource.

With reference to the fourteenth aspect or the first possible implementation of the fourteenth aspect, in a second possible implementation of the fourteenth aspect, the transceiver is further configured to send third configuration information to the terminal. The third configuration information is used to indicate the terminal to send a reference signal to the first network device through both the first antenna port and the second antenna port within a first time and send a reference signal to the first network device through only the first antenna port within a second time, or the third configuration information is used to indicate the terminal to send a reference signal to the first network device through the second quantity of antenna ports within the first time and send a reference signal to the first network device through the first quantity of antenna ports within the second time. The first time and the second time are adjacent and are alternated in time domain. In this way, a second network device can schedule the terminal within the second time through protocol specification or negotiation between a network side and a terminal side, thereby avoiding a conflict caused when the first network device and the second network device schedule the terminal.

With reference to the fourteenth aspect, in a third possible implementation of the fourteenth aspect, if the first configuration information is used to indicate the third reference signal resource of the first quantity of antenna ports, and the second configuration information is used to indicate the fourth reference signal resource of the second quantity of antenna ports, the first configuration information is further used to indicate port numbers of the first quantity of antenna ports, and the second configuration information is further used to indicate port numbers of the second quantity of antenna ports.

With reference to any one of the fourteenth aspect and the first to the third possible implementations of the fourteenth aspect, in a fourth possible implementation of the fourteenth aspect, the transceiver is further configured to receive an uplink communication capability of the terminal that is reported by the terminal. The uplink communication capability of the terminal includes or indicates that an antenna capability used when the terminal sends a signal to the first network device is a first value in a first application scenario, and the antenna capability used when the terminal sends a signal to the first network device is a second value in a second application scenario. The antenna capability includes or indicates a quantity of antenna ports, a quantity of layers, a quantity of radio frequency links, a quantity of antennas, a maximum quantity of antenna ports, a maximum quantity of layers, a maximum quantity of radio frequency links, or a maximum quantity of antennas. The terminal reports the uplink communication capability of the terminal to the network device, and the network device determines, by using the uplink communication capability reported by the terminal, that the terminal supports switching from an antenna capability value to another antenna capability value. For example, when the terminal sends a signal to the first network device through the first antenna port and sends a signal to the second network device through the second antenna port, if the terminal supports switching of the antenna capability from one port to two ports, when the second antenna port is idle, the terminal may opportunistically send a signal to the first network device through both the second antenna port and the first antenna port. This can implement radio frequency link sharing or antenna port sharing, improve radio frequency link utilization or antenna port utilization, increase an uplink transmission rate, and improve a communication capability.

With reference to the fourteenth aspect, in the first application scenario, the terminal may send a signal to the second network device, and, in the second application scenario, the terminal may not send a signal to the second network device. Alternatively, in the first application scenario, the terminal may be allowed to send a first time domain resource of a signal to the second network device, and, in the second application scenario, the terminal may not be allowed to send a second time domain resource of a signal to the second network device.

With reference to the fourteenth aspect, the transceiver may be further configured to send indication information to the terminal. The indication information is used to indicate the terminal to enable the uplink communication capability of the terminal. In this way, the uplink communication capability of the terminal can be enabled according to a network-side indication, and a capability of the network device can be balanced.

According to a fifteenth aspect, a communications apparatus is provided. The apparatus may be applied to a terminal or the apparatus is the terminal. The apparatus includes a processor and a transceiver. The processor is configured to: couple to a memory, invoke a program in the memory, and execute the program to implement the following steps: receiving configuration information from a network device through the transceiver, where the configuration information is used to indicate a port number and a reference signal resource that are used by the terminal to send a reference signal to the network device; and sending, through the transceiver, the reference signal to the network device on the reference signal resource based on the configuration information by using the port number. By using a configured port number used for signal sending, the terminal can determine an antenna port and can estimate a channel status corresponding to the antenna port.

According to a sixteenth aspect, a chip is provided. The chip is connected to a memory or the chip includes the memory, and is configured to read and execute a software program stored in the memory, to implement the method according to the first aspect and any possible implementation of the first aspect, the method according to the second aspect and any possible implementation of the second aspect, the method according to the third aspect and any possible implementation of the third aspect, and the method according to the fifth aspect and any possible implementation of the fifth aspect.

According to a seventeenth aspect, a chip is provided. The chip is connected to a memory or the chip includes the memory and is configured to read and execute a software program stored in the memory, to implement the method according to the fourth aspect and any possible implementation of the fourth aspect.

According to an eighteenth aspect, a communications system is provided. The communications system includes a terminal, a first network device, and a second network device. The terminal is configured to perform the method according to any one of the foregoing aspects and any possible implementation of the any one of the foregoing aspects.

According to a nineteenth aspect, a non-transitory computer storage medium is provided. The non-transitory computer storage medium stores a computer program, and the computer program includes an instruction used to perform the method according to any one of the foregoing aspects.

According to a twentieth aspect, a computer program product is provided. When a computer reads and executes the computer program product, the computer is enabled to perform the method according to any one of the foregoing aspects.

According to a twenty-first aspect, an embodiment may provide a chip system. The chip system includes a processor, and may further include a memory, to implement the method according to any one of the foregoing aspects and any possible implementation of the any one of the foregoing aspects. The chip system may include a chip or may include the chip and another discrete device.

According to a twenty-second aspect, an embodiment may provide a processor. The processor includes at least one circuit, configured to perform the method according to any one of the foregoing aspects and any possible implementation of the any one of the foregoing aspects.

DETAILED DESCRIPTION OF THE EMBODIMENTS

The embodiments may provide a communications method and apparatus, to implement radio frequency link sharing, improve radio frequency link utilization, and increase an uplink transmission rate. Because a problem-resolving principle of the method is similar to that of the apparatus, for implementations of the apparatus and the method, mutual reference may be made, and details are not repeatedly described. In descriptions of the embodiments, the term "and/or" describes an association relationship between associated objects and represents that three relationships may exist. For example, A and/or B may represent the following three cases: only A exists, both A and B exist, and only B exists. The character "/" generally indicates an "or" relationship between the associated objects. In this application, "at least one" means one or more, and "a plurality of" means two or more. In addition, it should be understood that, in the descriptions, terms such as "first" and "second" are merely for distinguishing purposes for ease of description but should not be understood as an indication or implication of relative importance or an indication or implication of an order. In addition, "at least one type" means one or more types, "at least one" means one or more, and "a plurality of" means two or more.

The communications method provided in the embodiments may be applied to a fourth-generation (4G) communications system, a fifth-generation (5G) communications system, or various future communications systems. The method may be applied to a dual connectivity (DC) scenario and may also be applied to a carrier aggregation (CA) scenario.

The following describes the embodiments in detail with reference to the accompanying drawings.

Figure 2:
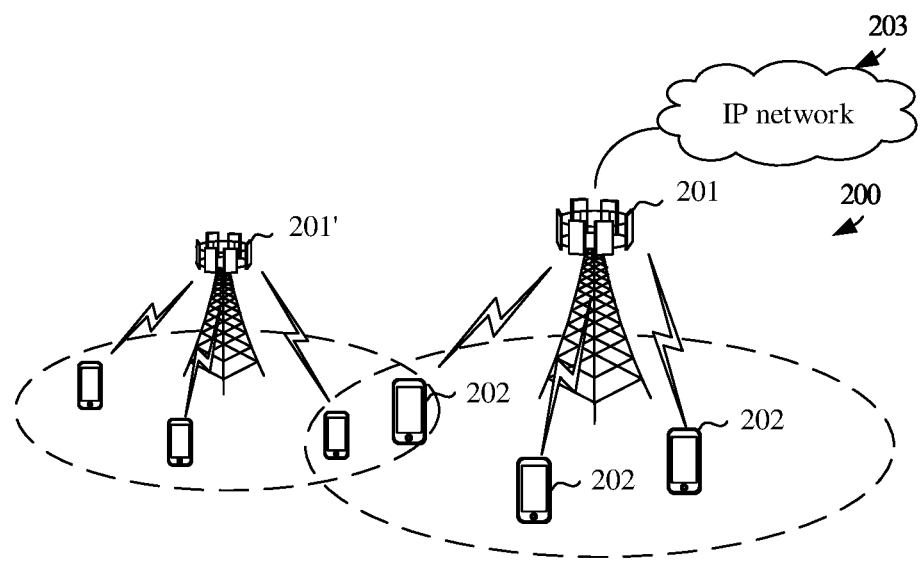
FIG. 2 is a schematic diagram of an architecture of a communications system according to an embodiment.

FIG. 2 shows a possible architecture of a communications system applicable to the communications method provided in the embodiments. As shown in FIG. 2, a communications system 200 includes a network device 201 and one or more terminals 202. When the communications system 200 includes a core network, the network device 201 may be further connected to the core network. The network device 201 may communicate with an IP network 203 through the core network. For example, the IP network 203 may be the internet, a private IP network, or another data network. The network device 201 serves the terminal 201 within a coverage area. For example, referring to FIG. 2, the network device 201 provides wireless access for the one or more terminals 202 within the coverage area of the network device 201. The communications system 200 may include a plurality of network devices, for example, may further include a network device 201'. There may be an overlapping area between coverage areas of network devices. For example, there is an overlapping area between coverage areas of the network device 201 and the network device 201'. The network devices may further communicate with each other. For example, the network device 201 may communicate with the network device 201'.

The network device 201 is a node in a radio access network (RAN) and may also be referred to as a base station or may be referred to as a RAN node (or device). Currently, for example, the network device 201 is a gNB/an NR-NB, a transmission reception point (TRP), an evolved NodeB (eNB), a radio network controller (RNC), a NodeB (NB), a base station controller (BSC), a base transceiver station (BTS), a home eNodeB (HNB), a baseband unit (BBU), a wireless fidelity (Wifi) access point (AP), or a network side device in a 5G communications system or a possible future communications system.

The terminal 202 is also referred to as user equipment (UE), a mobile station (MS), a mobile terminal (MT), or the like. The terminal 202 is a device that provides a user with voice or data connectivity or may be an internet of things device. For example, the terminal 202 includes a handheld device or a vehicle-mounted device having a wireless connection function. Currently, the terminal 202 may be a mobile phone, a tablet, a notebook computer, a palmtop computer, a mobile internet device (MID), a wearable device (such as a smartwatch, a smart band, or a pedometer), a vehicle-mounted device (such as an automobile, a bicycle, an electric vehicle, an aircraft, a ship, a train, or a high-speed train), a virtual reality (VR) device, an augmented reality (AR) device, a wireless terminal in industrial control, a smart home device (such as a refrigerator, a television, an air conditioner, or an electricity meter), an intelligent robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, a flight device (such as an intelligent robot, a hot balloon, a drone, or an aircraft), or the like.

For ease of understanding, some concepts and terms used in the embodiments are first described.

Figure 1:
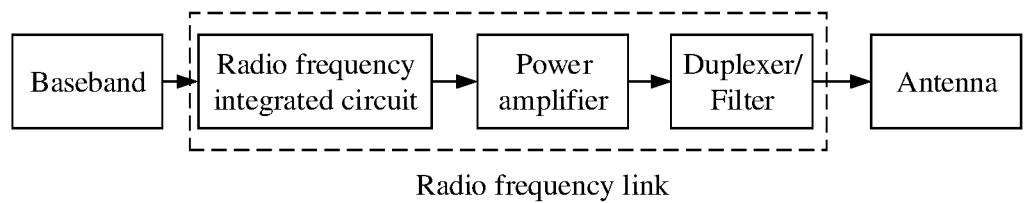
FIG. 1 is a schematic structural diagram of a radio frequency link according to an embodiment.

(1) Radio frequency link: A radio frequency link in an uplink direction may be referred to as a radio frequency transmit link, and a radio frequency link in a downlink direction may be referred to as a radio frequency receive link. As shown in FIG. 1, a radio frequency signal is generated after a baseband signal generated by a terminal on a baseband passes through a radio frequency transmit link, and the radio frequency signal is sent by using an antenna. Similarly, a signal received by the terminal from the antenna is received over a radio frequency receive link and is processed on the baseband. A radio frequency link includes a radio frequency integrated circuit, a power amplifier, and a duplexer/filter. The terminal may access a plurality of network devices, and the terminal communicates with the plurality of network devices over a plurality of radio frequency links. One radio frequency link may correspond to one network device. For example, the terminal may access two or four network devices. The terminal may access the plurality of network devices through DC, or may access the plurality of network devices through CA. The radio frequency link may be integrated into a radio frequency chip or may be integrated into a same chip as a baseband processing circuit.

Figure 3A:
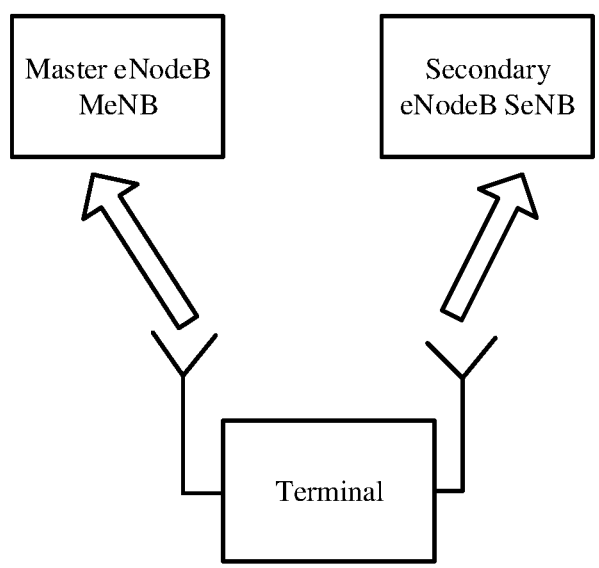
FIG. 3a is a schematic diagram 1 of a dual connectivity manner according to an embodiment.
Figure 3B:
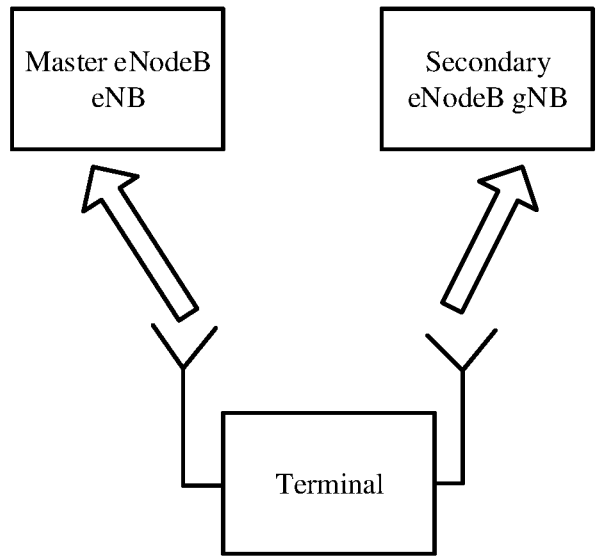
FIG. 3b is a schematic diagram 2 of a dual connectivity manner according to an embodiment.
Figure 3C:
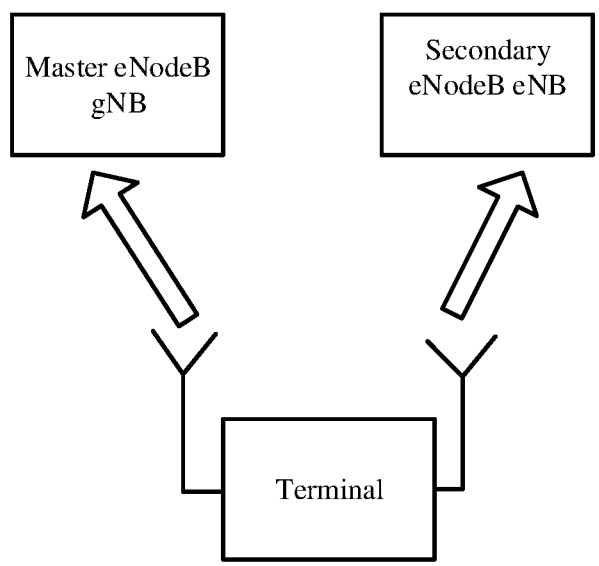
FIG. 3c is a schematic diagram 3 of a dual connectivity manner according to an embodiment.
Figure 3D:
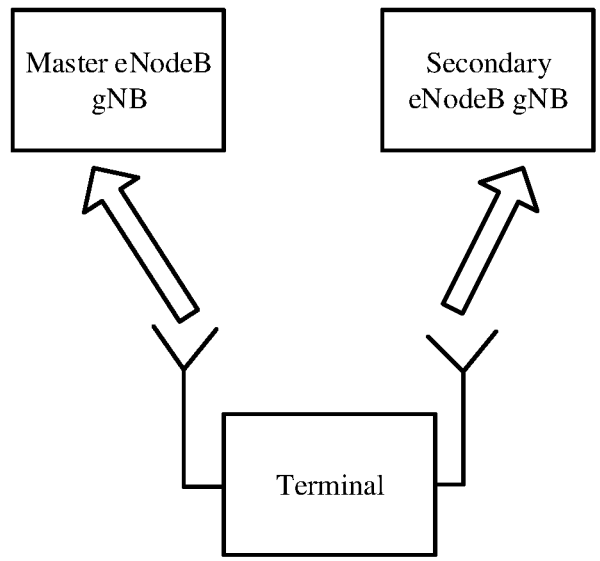
FIG. 3d is a schematic diagram 4 of a dual connectivity manner according to an embodiment.

(2) DC: DC is a mode of a terminal in a radio resource control (RRC) connected mode (RRC_CONNECTED mode). A network device configures one master cell group (MCG) and one secondary cell group (SCG) for the terminal. If the network device supports DC, the terminal in an RRC_CONNECTED mode may be configured to use radio resources provided by two different network devices. For example, as shown in FIG. 3a, in long term evolution (LTE), a terminal is configured to use radio resources provided by two eNBs. The two eNBs are connected through an X2 interface. One eNB serves as a master eNodeB (MeNB), and the other eNB serves as a secondary eNodeB (SeNB). In DC, one terminal is connected to one MeNB and one SeNB. As shown in FIG. 3b, in new radio (NR), an LTE-NR dual connectivity manner may be used, and a terminal is configured to use radio resources provided by an eNB in LTE and a gNB in NR. Optionally, the eNB serves as a master eNodeB, and the gNB serves as a secondary eNodeB. As shown in FIG. 3c, an NR-LTE dual connectivity manner may be alternatively used. A gNB serves as a master eNodeB, and an eNB serves as a secondary eNodeB. As shown in FIG. 3d, an NR-NR dual connectivity manner may be alternatively used, and a terminal is configured to use radio resources provided by two gNBs. One gNB serves as a master eNodeB, and the other gNB serves as a secondary eNodeB.

(3) Antenna port: On a network side, a radio frequency link and an antenna may be abstracted as antenna port concepts. When a terminal has N radio frequency links, the terminal can communicate with a network device through a maximum of N antenna ports at the same time. For example, if N is 2 and the terminal has two radio frequency links, the terminal can communicate with the network device through a maximum of two antenna ports at the same time. During actual application, each radio frequency link corresponds to one antenna port. If the terminal communicates with the network device through one antenna port, the terminal may enable either of the two radio frequency links to correspond to the antenna port or may obtain one antenna port through simulation by simultaneously using the two radio frequency links. This depends on implementation on a terminal side and is transparent to the network device. The network device only needs to schedule an antenna port on which the terminal sends an uplink signal.

(4) "The antenna capability includes" may be replaced with "the antenna capability indicates", and meanings of the two expressions may be equivalent. Similarly, "the uplink communication capability includes" may be replaced with "the uplink communication capability indicates", and meanings of the two expressions are equivalent.

Figure 4:
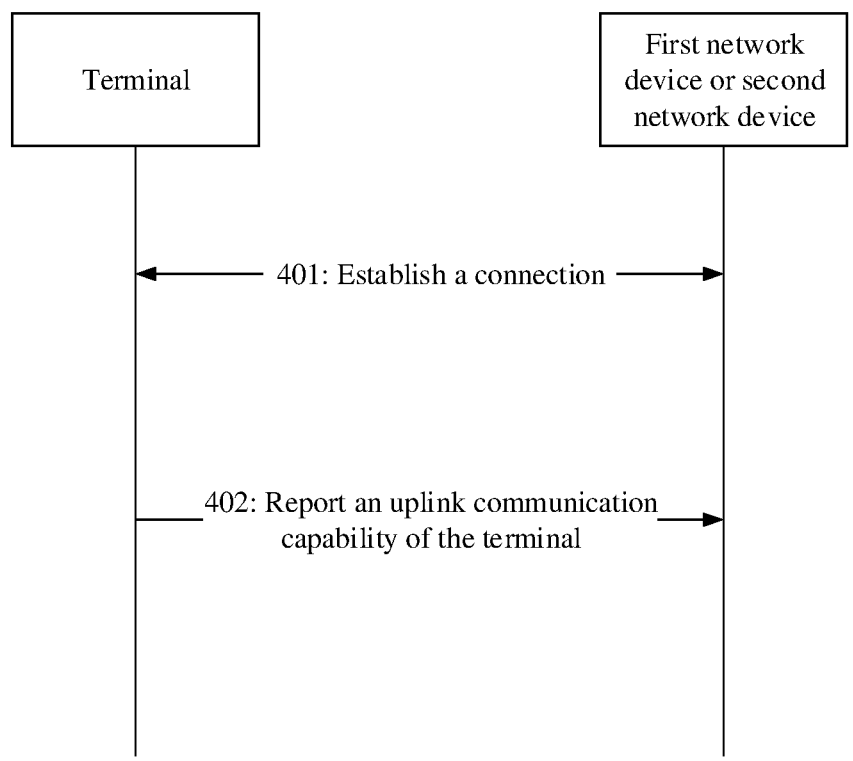
FIG. 4 is a schematic flowchart of a communications method 1 according to an embodiment.

Based on the foregoing descriptions and the architecture of the communications system shown in FIG. 2, as shown in FIG. 4, the following describes in detail a communications method 1 according to an embodiment.

Step 401: A terminal establishes a connection to a first network device or a second network device.

It should be noted herein that the first network device and the second network device may be network devices in systems of different communication standards. For example, the terminal establishes connections to both the first network device and the second network device in through DC. Alternatively, the first network device and the second network device are network devices in systems of a same communication standard. For example, the terminal accesses the first network device and the second network device through CA.

In this step, that the terminal establishes the connection to the first network device means that the terminal establishes an RRC connection to the first network device. In this case, it may be considered that the first network device is a master base station, and the second network device is a secondary base station. When the terminal needs to send a signal to the second network device, the terminal may send the signal to the first network device, and the first network device transmits the signal to the second network device through an X2 interface between the base stations. The signal may be, for example, RRC signaling.

That the terminal establishes the connection to the second network device means that the terminal establishes an RRC connection to the second network device. In this case, it may be considered that the second network device is a master base station, and the first network device is a secondary base station. When the terminal needs to send a signal to the first network device, the terminal may send the signal to the second network device, and the second network device transmits the signal to the first network device through the X2 interface between the base stations.

Step 402: The terminal reports an uplink communication capability of the terminal to the first network device or the second network device, and the first network device or the second network device receives the uplink communication capability of the terminal that is reported by the terminal.

Optionally, the first network device or the second network device sends indication information to the terminal. The indication information is used to indicate whether the terminal enables the uplink communication capability of the terminal. The terminal receives the indication information from the first network device or the second network device, and determines, according to the indication information, whether to enable the uplink communication capability of the terminal. Only when the uplink communication capability of the terminal is enabled, the terminal can switch a supported antenna capability from a first value to a second value and can opportunistically send a signal to the first network device over an idle radio frequency link of the second network device.

When the terminal establishes the connection to the first network device, the terminal reports the uplink communication capability of the terminal to the first network device. When the terminal establishes the connection to the second network device, the terminal reports the uplink communication capability of the terminal to the second network device.

If the terminal needs to opportunistically send a signal to the first network device over both the idle radio frequency link and a radio frequency link that corresponds to the first network device, the first network device needs to learn of the uplink communication capability of the terminal. When the terminal reports the uplink communication capability of the terminal to the first network device, the first network device learns of the uplink communication capability of the terminal. Alternatively, when the terminal reports the uplink communication capability of the terminal to the second network device, the second network device sends the uplink communication capability of the terminal to the first network device, and the first network device learns of the uplink communication capability of the terminal based on received information sent by the second network device.

The uplink communication capability includes that the antenna capability used when the terminal sends a signal to the first network device is the first value in a first application scenario, and the antenna capability used when the terminal sends a signal to the first network device is the second value in a second application scenario.

The antenna capability includes a quantity of antenna ports, a quantity of layers, a quantity of radio frequency links, a quantity of antennas, a maximum quantity of antenna ports, a maximum quantity of layers, a maximum quantity of radio frequency links, or a maximum quantity of antennas. In descriptions of this embodiment, an antenna port is described as an example, and a method of the antenna port may also be applied to another antenna capability expression form.

If the antenna capability is the maximum quantity of antenna ports, the uplink communication capability includes that the maximum quantity of antenna ports used when the terminal sends a signal to the first network device is the first value in the first application scenario, and the maximum quantity of antenna ports used when the terminal sends a signal to the first network device is the second value in the second application scenario. For example, if the first value is 1 and the second value is 2, the uplink communication capability includes that the maximum quantity of antenna ports used when the terminal sends a signal to the first network device is 1 in the first application scenario, in other words, the antenna capability supported by the terminal is one port, and the maximum quantity of antenna ports used when the terminal sends a signal to the first network device is 2 in the second application scenario, in other words, the antenna capability supported by the terminal is two ports.

The first application scenario and the second application scenario are two different scenarios or two different time domain resources. The first application scenario is that the terminal sends a signal to the second network device, and the second application scenario is that the terminal does not send a signal to the second network device. When the terminal does not send a signal to the second network device, a radio frequency link or an antenna port corresponding to the second network device is idle. In this case, the terminal may send a signal to the first network device over the idle radio frequency link or through the idle antenna port.

Alternatively, the first application scenario is that the terminal is allowed to send a first time domain resource of a signal to the second network device, and the second application scenario is that the terminal is not allowed to send a second time domain resource of a signal to the second network device. The first time domain resource and the second time domain resource are configured on a network side or may be specified in a protocol.

The terminal may report the uplink communication capability of the terminal in method 1 or method 2 below.

Method 1: The terminal sends a first message to the first network device or the second network device. The first message may be an RRC message, and the first message carries the uplink communication capability of the terminal.

An information element (information element, IE) in the first message is used to indicate the uplink communication capability of the terminal, and the IE is represented by a first IE. The IE may be of an enumerated type. For example, the IE is expressed as follows: uplink communication capability—enumerated type {capability 1, capability 2, . . . , capability n}. The capability 1 to the capability n are n enumerated uplink communication capabilities, and one of the capabilities is the uplink communication capability reported by the terminal in step 402.

For example, if the antenna capability is the maximum quantity of antenna ports, the uplink communication capability of the terminal includes that the maximum quantity of antenna ports used when the terminal sends a signal to the first network device is the first value in the first application scenario, and the maximum quantity of antenna ports used when the terminal sends a signal to the first network device is the second value in the second application scenario.

If the first value is 1 and the second value is 2, the IE may be expressed as follows: antennaPortCapability ENUMERATED {oneAntennaPort, twoAntennaPort, onePlusOneAntennaPort}, where antennaPortCapability indicates an antenna port capability, that is, the uplink communication capability of the terminal, and is a name of the RRC signaling; ENUMERATED indicates that the IE is of an enumerated type, and a value of the antenna port capability is any one of enumerated values; oneAntennaPort indicates that the antenna port capability is one antenna port, in other words, the maximum quantity of antenna ports supported by the terminal when the terminal sends a signal to the first network device is 1; twoAntennaPort indicates that the antenna port capability is two antenna ports, in other words, the maximum quantity of antenna ports supported by the terminal when the terminal sends a signal to the first network device is 2; and onePlusOneAntennaPort indicates that the antenna port capability is switched from one antenna port to two antenna ports, in other words, the maximum quantity of antenna ports supported by the terminal when the terminal sends a signal to the first network device is switched from the one antenna port to the two antenna ports. It can be understood that, in this case, the one antenna port is used in the first application scenario, and the two antenna ports are used in the second application scenario.

If the first value is 2 and the second value is 4, the IE may be expressed as follows: antennaPortCapability ENUMERATED {oneAntennaPort, twoAntennaPort, twoAntennaPort, onePlusOneAntennaPort, twoPlusTwoAntennaPort}, where antennaPortCapability indicates an antenna port capability, that is, the uplink communication capability of the terminal, and is a name of the RRC signaling; ENUMERATED indicates that the IE is of an enumerated type, and a value of the antenna port capability is any one of enumerated values; oneAntennaPort indicates that the antenna port capability is one antenna port, in other words, the maximum quantity of antenna ports supported by the terminal when the terminal sends a signal to the first network device is 1; twoAntennaPort indicates that the antenna port capability is two antenna ports, in other words, the maximum quantity of antenna ports supported by the terminal when the terminal sends a signal to the first network device is 2; fourAntennaPort indicates that the antenna port capability is four antenna ports, in other words, the maximum quantity of antenna ports supported by the terminal when the terminal sends a signal to the first network device is 4; and onePlusOneAntennaPort indicates that the antenna port capability is switched from 1 to 2, in other words, the maximum quantity of antenna ports supported by the terminal when the terminal sends a signal to the first network device is switched from the one antenna port to the two antenna ports. It can be understood that, in this case, the one antenna port is used in the first application scenario, and the two antenna ports are used in the second application scenario. In addition, twoPlusTwoAntennaPort indicates that the antenna port capability is switched from two antenna ports to four antenna ports, in other words, the maximum quantity of antenna ports supported by the terminal when the terminal sends a signal to the first network device is switched from 2 to 4. It can be understood that, in this case, the two antenna ports are used in the first application scenario, and the four antenna ports are used in the second application scenario.

Method 2: The terminal sends a second message to the first network device or the second network device. The second message may be an RRC message, and the second message carries the uplink communication capability of the terminal.

Two IEs in the second message are used to indicate the uplink communication capability of the terminal. The two IEs are respectively represented by a second IE and a third IE. The second IE may be of an enumerated type. For example, the IE is expressed as follows: uplink communication capability-enumerated type {capability 1, capability 2, . . . , capability n}. The capability 1 to the capability n are n enumerated uplink communication capabilities, and the capability 1 to the capability n do not include the uplink communication capability reported by the terminal in step 402. The third IE may be of a Boolean type. For example, the third IE is expressed as follows: uplink communication capability—Boolean type. An uplink communication capability indicated in the third IE is the uplink communication capability reported by the terminal in step 402. A value of the Boolean type is true or false. If the value of the Boolean type is true, it indicates that the terminal supports the uplink communication capability; or if the value of the Boolean type is false, it indicates that the terminal does not support the uplink communication capability.

For example, if the antenna capability is the maximum quantity of antenna ports, the uplink communication capability of the terminal includes that the maximum quantity of antenna ports used when the terminal sends a signal to the first network device is the first value in the first application scenario, and the maximum quantity of antenna ports used when the terminal sends a signal to the first network device is the second value in the second application scenario.

If the first value is 1 and the second value is 2, the second IE may be expressed as follows: antennaPortCapability ENUMERATED {oneAntennaPort, twoAntennaPort} or antennaPortCapability ENUMERATED {oneAntennaPort, twoAntennaPort, fourAntennaPort}, where antennaPortCapability indicates an antenna port capability, that is, the uplink communication capability of the terminal, and is a name of the RRC signaling; ENUMERATED indicates that the second IE is of the enumerated type, and a value of the antenna port capability is any one of enumerated values; oneAntennaPort indicates that the antenna port capability is one antenna port, in other words, the maximum quantity of antenna ports supported by the terminal when the terminal sends a signal to the first network device is 1; twoAntennaPort indicates that the antenna port capability is two antenna ports, in other words, the maximum quantity of antenna ports supported by the terminal when the terminal sends a signal to the first network device is 2; and fourAntennaPort indicates that the antenna port capability is four antenna ports, in other words, the maximum quantity of antenna ports supported by the terminal when the terminal sends a signal to the first network device is 4. The third IE may be expressed as follows: onePlusOneAntennaPort BOOLEAN, where onePlusOneAntennaPort indicates that the antenna port capability is switched from one antenna port to two antenna ports, in other words, the maximum quantity of antenna ports supported by the terminal when the terminal sends a signal to the first network device is switched from the one antenna port to the two antenna ports. It can be understood that, in this case, the one antenna port is used in the first application scenario, and the two antenna ports are used in the second application scenario. In addition, BOOLEAN indicates that the third IE is of the Boolean type. When a Boolean value is true, it indicates that the terminal supports the antenna port capability of onePlusOneAntennaPort; or when a Boolean value is false, it indicates that the terminal does not support the antenna port capability of onePlusOneAntennaPort. It can be understood that, only when a value of the enumerated type of the second IE is twoAntennaPort or fourAntennaPort, the third IE indicates that the supported antenna port capability of onePlusOneAntennaPort is valid.

If the first value is 2 and the second value is 4, the second IE may be expressed as follows: antennaPortCapability ENUMERATED {oneAntennaPort, twoAntennaPort, fourAntennaPort}, where antennaPortCapability indicates an antenna port capability, that is, the uplink communication capability of the terminal, and is a name of the RRC signaling; ENUMERATED indicates that the second IE is of the enumerated type, and a value of the antenna port capability is any one of enumerated values; oneAntennaPort indicates that the antenna port capability is one antenna port, in other words, the maximum quantity of antenna ports supported by the terminal when the terminal sends a signal to the first network device is 1; twoAntennaPort indicates that the antenna port capability is two antenna ports, in other words, the maximum quantity of antenna ports supported by the terminal when the terminal sends a signal to the first network device is 2; and fourAntennaPort indicates that the antenna port capability is four antenna ports, in other words, the maximum quantity of antenna ports supported by the terminal when the terminal sends a signal to the first network device is 4. The third IE may be expressed as follows: twoPlusTwoAntennaPort BOOLEAN, where twoPlusTwoAntennaPort indicates that the antenna port capability is switched from two antenna ports to four antenna ports, in other words, the maximum quantity of antenna ports supported by the terminal when the terminal sends a signal to the first network device is switched from 2 to 4. It can be understood that, in this case, the two antenna ports are used in the first application scenario, and the four antenna ports are used in the second application scenario. In addition, BOOLEAN indicates that the third IE is of the Boolean type. When a Boolean value is true, it indicates that the terminal supports the antenna port capability of twoPlusTwoAntennaPort; or when a Boolean value is false, it indicates that the terminal does not support the antenna port capability of twoPlusTwoAntennaPort. It can be understood that, only when a value of the enumerated type of the second IE is fourAntennaPort, the third IE indicates that the supported antenna port capability of twoPlusTwoAntennaPort is valid.

It should be noted that the second IE and the third IE may be carried in the second message for sending or may be carried in two messages for sending.

According to the communications method 1, the terminal reports the uplink communication capability of the terminal to a network device, and the network device determines, by using the uplink communication capability reported by the terminal, that the terminal supports switching from an antenna capability value to another antenna capability value. For example, the terminal sends a signal to the first network device through a first antenna port and sends a signal to the second network device through a second antenna port. If the terminal supports switching of the antenna capability from one port to two ports, when the second antenna port is idle, the terminal may opportunistically send a signal to the first network device through both the second antenna port and the first antenna port. This can implement radio frequency link sharing or antenna port sharing, improve radio frequency link utilization or antenna port utilization, increase an uplink transmission rate, and improve a communication capability.

Before sending an uplink signal, the terminal sends a reference signal to perform channel measurement. For the terminal having the uplink communication capability that is provided in Embodiment 1, the terminal can support different antenna capabilities in different application scenarios. When the antenna capability of the terminal is switched to a plurality of antenna ports for signal sending, different channels corresponding to different antenna ports need to be measured. Therefore, the terminal needs to report different reference signals corresponding to the different antenna ports to the network device. In this case, the network device needs to configure different reference signal resources for the terminal to report the reference signals for the channels corresponding to the different antenna ports. An example in which the antenna capability is a quantity of antenna ports is used for description in this embodiment. It can be understood that the antenna capability may alternatively be the quantity of layers, the quantity of radio frequency links, or the like.

Based on this, this embodiment may provide a method for configuring a reference signal resource for the terminal having the uplink communication capability that is provided in Embodiment 1, to implement radio frequency link sharing or antenna port sharing, thereby improving an uplink transmission rate. For a method, refer to the following communications method 2. It should be noted that the following communications method 2 may be used to configure a reference signal resource for the terminal having the uplink communication capability that is provided in Embodiment 1 or may be used to configure a reference signal resource for another type of terminal, and an effect of the method is that different reference signal resources can be configured for different antenna ports.

Figure 5:
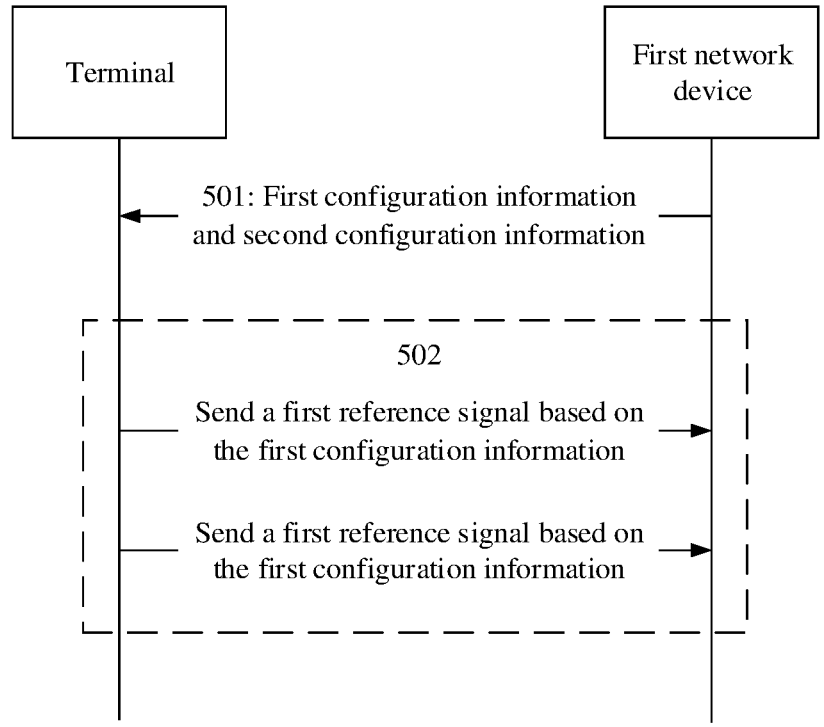
FIG. 5 is a schematic flowchart of a communications method 2 according to an embodiment.

Based on the architecture of the communications system shown in FIG. 2, as shown in FIG. 5, the following describes in detail the communications method 2 according to an embodiment.

A basic idea of the communications method 2 is as follows: A terminal receives a configuration message of a network device. The configuration message includes two pieces of configuration information, and the two pieces of configuration information are used to indicate two reference signal resources. The reference signal resource is a reference signal resource related to an antenna port number or a quantity of antenna ports. The terminal may send a reference signal based on one piece of configuration information and send a reference signal based on the other piece of configuration information. In this way, the terminal can obtain the two reference signal resources by using the two pieces of configuration information, thereby implementing radio frequency link sharing, improving radio frequency link utilization, and increasing an uplink transmission rate.

Step 501: A first network device sends first configuration information and second configuration information to the terminal, and the terminal receives the first configuration information and the second configuration information from the first network device.

The first configuration information is used to indicate a first reference signal resource of a first antenna port, and the second configuration information is used to indicate a second reference signal resource of a second antenna port; or the first configuration information is used to indicate a third reference signal resource of a first quantity of antenna ports, and the second configuration information is used to indicate a fourth reference signal resource of a second quantity of antenna ports.

Step 502: The terminal sends a first reference signal based on the first configuration information and sends a second reference signal based on the second configuration information, and the first network device receives the first reference signal and the second reference signal that are sent by the terminal.

The following describes in detail different cases based on different indication content of the first configuration information and the second configuration information.

In a first case, the first configuration information is used to indicate the first reference signal resource of the first antenna port, and the second configuration information is used to indicate the second reference signal resource of the second antenna port.

The terminal obtains the first reference signal resource of the first antenna port based on the first configuration information and sends the first reference signal on the first reference signal resource through the first antenna port. The terminal obtains the second reference signal resource of the second antenna port based on the second configuration information and sends the second reference signal on the second reference signal resource through the second antenna port. During actual application, the terminal may enable a first radio frequency link to correspond to the first antenna port and enable a second radio frequency link to correspond to the second antenna port. In this case, the terminal obtains the first reference signal resource of the first antenna port based on the first configuration information, and sends the first reference signal on the first reference signal resource over the first radio frequency link; and the terminal obtains the second reference signal resource of the second antenna port based on the second configuration information, and sends the second reference signal on the second reference signal resource over the second radio frequency link. The first reference signal is used to evaluate a channel status of the first antenna port, and the second reference signal is used to evaluate a channel status of the second antenna port. After receiving the first reference signal sent by the terminal, the first network device estimates the channel status of the first antenna port based on the first reference signal, in other words, the first network device estimates a channel status of the first radio frequency link based on the first reference signal. After receiving the second reference signal sent by the terminal, the first network device estimates the channel status of the second antenna port based on the second reference signal, in other words, the first network device estimates a channel status of the second radio frequency link based on the second reference signal.

In the first case, indication manners of the first configuration information and the second configuration information may include, but are not limited to, the following manners.

An IE in the first configuration information is used to indicate the first reference signal resource, or an IE in a resource type in the first configuration information is used to indicate the first reference signal resource.

An example in which a reference signal is an SRS is used. When the reference signal is of another type, the described method is applicable. The first configuration information is a first SRS-resource, or the first configuration information is a first SRS-resource set. An IE is newly added to the first SRS-resource or the first SRS-resource set, and the IE is used to indicate the first antenna port. Alternatively, an IE is newly added to a resource type in the first SRS-resource, or an IE is newly added to a resource type in the first SRS-resource set. The first SRS-resource is a variable or a configured name in the configuration information, or an IE name. Similarly, the second SRS-resource is a variable or a configured name in the configuration information, or an IE name.

A name of the newly added IE may be a supported antenna port (associatedAntennaPort), a type of the IE may be an enumerated type ENUMERATED and enumerated optional values of the IE include the first antenna port and another antenna port. For example, if the first antenna port is AntennaPort0, and the another antenna port is AntennaPort1, the IE may be expressed as follows: associatedAntennaPort ENUMERATED {AntennaPort0, AntennaPort1}. When an enumerated value is AntennaPort0, it indicates that an SRS resource indicated by the IE is the first SRS-resource (that is, the first reference signal resource) of the first antenna port. When receiving the first SRS-resource or the first SRS-resource set, the terminal may determine, based on the IE newly added to the first SRS-resource or the first SRS-resource set and based on that the enumerated value of the IE is AntennaPort0, that the first SRS-resource is associated with the first antenna port AntennaPort0. In the terminal, the first antenna port AntennaPort0 is mapped to the first radio frequency link. In this case, the terminal may send a first SRS on the first SRS-resource over the first radio frequency link, and the first network device may measure quality of a channel between the terminal and the first antenna port based on the received first SRS.

Similarly, an IE in the second configuration information is used to indicate the second reference signal resource, or an IE in a resource type in the second configuration information is used to indicate the second reference signal resource.

Similarly, an example in which a reference signal is an SRS is used. When the reference signal is of another type, the described method is applicable. The second configuration information is the second SRS-resource, or the second configuration information is a second SRS-resource set. An IE is newly added to the second SRS-resource or the second SRS-resource set, and the IE is used to indicate the second antenna port. Alternatively, an IE is newly added to a resource type in the second SRS-resource, or an IE is newly added to a resource type in the second SRS-resource set.

A name of the newly added IE may be a supported antenna port (associatedAntennaPort), a type of the IE may be an enumerated type ENUMERATED and enumerated optional values of the IE include the second antenna port and another antenna port. For example, if the second antenna port is AntennaPort1, and the another antenna port is AntennaPort0, the IE may be expressed as follows: associatedAntennaPort ENUMERATED {AntennaPort0, AntennaPort1}. When an enumerated value is AntennaPort1, it indicates that an SRS resource indicated by the IE is the second SRS-resource (that is, the second reference signal resource) of the second antenna port. When receiving the second SRS-resource or the second SRS-resource set, the terminal may determine, based on the IE newly added to the second SRS-resource or the second SRS-resource set and based on that the enumerated value of the IE is AntennaPort1, that the second SRS-resource is associated with the second antenna port AntennaPort1. In the terminal, the second antenna port AntennaPort1 is mapped to the second radio frequency link. In this case, the terminal may send a second SRS on the second SRS-resource over the second radio frequency link, and the first network device may measure channel quality of the second antenna port based on the received second SRS.

In this way, different reference signal resources are configured for different antenna ports, so that the terminal can send different reference signals on the different reference signal resources, and the network device determines, by using the different reference signals, channel quality of radio frequency links corresponding to the different antenna ports, thereby implementing radio frequency link sharing, improving radio frequency link utilization, and increasing an uplink transmission rate.

In a second case, the first configuration information is used to indicate the third reference signal resource of the first quantity of antenna ports, and the second configuration information is used to indicate the fourth reference signal resource of the second quantity of antenna ports.

The terminal obtains the third reference signal resource of the first quantity of antenna ports based on the first configuration information and sends the first reference signal on the third reference signal resource through the first quantity of antenna ports in an application scenario in which the first quantity of antenna ports is used. The terminal obtains the fourth reference signal resource of the second quantity of antenna ports based on the second configuration information and sends the second reference signal on the fourth reference signal resource through the second quantity of antenna ports in an application scenario in which the second quantity of antenna ports are used. The first quantity of antenna ports herein means that a quantity of antenna ports is a first quantity. For example, if the first quantity is 1, the quantity of antenna ports using the third reference signal resource is 1, and the terminal sends the first reference signal on the third reference signal resource through one antenna port. Likewise, the second quantity of antenna ports means that a quantity of antenna ports is a second quantity. For example, if the first quantity is 2, the quantity of antenna ports using the fourth reference signal resource is 2, and the terminal sends the second reference signal on the fourth reference signal resource through two antenna ports.

It is assumed that the first quantity is $2^m$, and the second quantity is $2^{m+1}$, where m is an integer, such as 0, 1, or 2. During actual application, the terminal may enable $2^m$ first radio frequency links to correspond to $2^m$ first antenna ports and enable $2^m$ second radio frequency links to correspond to $2^m$ second antenna ports. Herein, the first radio frequency link is a radio frequency link used when the terminal communicates with the first network device in a first application scenario, and the first antenna port is an antenna port used when the terminal communicates with the first network device in the first application scenario. Herein, the second radio frequency link is a radio frequency link used when the terminal communicates with a second network device in the first application scenario, and the second antenna port is an antenna port used when the terminal communicates with the second network device in the first application scenario. In the first application scenario, the terminal sends a signal to the first network device through $2^m$ first antenna ports and sends a signal to the second network device through $2^m$ second antenna ports. In a second application scenario, the terminal may send a signal to the first network device through $2^{m+1}$ antenna ports. When the terminal obtains the third reference signal resource of the first quantity of antenna ports based on the first configuration information and obtains the fourth reference signal resource of the second quantity of antenna ports based on the second configuration information, the terminal determines that the first quantity is less than the second quantity. Therefore, it is determined that the third reference signal resource is used for sending a signal to the first network device through the $2^m$ first antenna ports in the first application scenario, and it is determined that the fourth reference signal resource is used for sending a signal to the first network device through the $2^{m+1}$ antenna ports in the second application scenario. In this case, the terminal sends the first reference signal on the third reference signal resource through the $2^m$ first antenna ports (or over the $2^m$ first radio frequency links) and sends the second reference signal on the fourth reference signal resource through the $2^m$ first antenna ports (or over the $2^m$ first radio frequency links) and the $2^m$ second antenna ports (or over the $2^m$ second radio frequency links). After receiving the first reference signal sent by the terminal, the first network device estimates channel statuses of the $2^m$ first antenna ports (or the $2^m$ first radio frequency links) based on the first reference signal. After receiving the second reference signal sent by the terminal, the first network device estimates channel statuses of the $2^m$ first antenna ports (or the $2^m$ first radio frequency links) and the $2^m$ second antenna ports (or the $2^m$ second radio frequency links) based on the second reference signal.

In the second case, indication manners of the first configuration information and the second configuration information are described as follows:

An IE in the first configuration information is used to indicate the third reference signal resource. An IE that is used to indicate a quantity of ports in the first configuration information may indicate the third reference signal resource. If the quantity of ports that is indicated by the IE in the first configuration information is the first quantity, it indicates that the third reference signal resource indicated by the first configuration information is a resource of the first quantity of antenna ports.

An IE in the second configuration information is used to indicate the fourth reference signal resource. An IE that is used to indicate a quantity of ports in the second configuration information may indicate the fourth reference signal resource. If the quantity of ports that is indicated by the IE in the second configuration information is the second quantity, it indicates that the fourth reference signal resource indicated by the second configuration information is a resource of the second quantity of antenna ports.

An example in which a reference signal is an SRS is used. When the reference signal is of another type, the described method is applicable. The first configuration information is a third SRS-resource, or the first configuration information is a third SRS-resource set. An IE in the third SRS-resource or the third SRS-resource set is used to indicate the first quantity of antenna ports. For example, the IE is expressed as follows: nrofSRS-Ports ENUMERATED {port1, ports2, ports4}, where nrofSRS-Ports is an IE name, ENUMERATED is an enumerated type, and a value in parentheses is an enumerated optional value. When an optional value is port1, it indicates that the first quantity is 1, and it indicates that the third SRS-resource is a resource of one antenna port. When an optional value is port2, it indicates that the first quantity is 2, and it indicates that the third SRS-resource is a resource of two antenna ports. When an optional value is port4, it indicates that the first quantity is 4, and it indicates that the third SRS-resource is a resource of four antenna ports.

Similarly, the second configuration information is a fourth SRS-resource (SRS-resource), or the second configuration information is a fourth SRS-resource set (SRS-resource set). An IE in the fourth SRS-resource or the fourth SRS-resource set is used to indicate the second quantity of antenna ports. For example, the IE is expressed as follows: nrofSRS-Ports ENUMERATED {port1, ports2, ports4}, where nrofSRS-Ports is an IE name, ENUMERATED is an enumerated type, and a value in parentheses is an enumerated optional value. When an optional value is port1, it indicates that the second quantity is 1, and it indicates that the fourth SRS-resource is a resource of one antenna port. When an optional value is port2, it indicates that the second quantity is 2, and it indicates that the fourth SRS-resource is a resource of two antenna ports. When an optional value is port4, it indicates that the second quantity is 4, and it indicates that the fourth SRS-resource is a resource of four antenna ports.

When receiving the third SRS-resource or the third SRS-resource set, the terminal determines a third SRS-resource of the first quantity of antenna ports based on the quantity of antenna ports that is indicated by the IE included in the third SRS-resource or the third SRS-resource set, and therefore the terminal sends a first SRS on the third SRS-resource through the first quantity of antenna ports. When receiving the fourth SRS-resource or the fourth SRS-resource set, the terminal determines a fourth SRS-resource of the second quantity of antenna ports based on the quantity of antenna ports that is indicated by the IE included in the fourth SRS-resource or the fourth SRS-resource set, and therefore the terminal sends a second SRS on the fourth SRS-resource through the second quantity of antenna ports. The first quantity of antenna ports is mapped to the first quantity of radio frequency links, and the second quantity of antenna ports are mapped to the second quantity of radio frequency links. The first network device may measure channel quality of the first quantity of radio frequency links based on the received first SRS and may measure channel quality of the second quantity of radio frequency links based on the received second SRS.

In this way, different reference signal resources are configured for different quantities of antenna ports, so that reference signal resources corresponding to different radio frequency links can be implicitly indicated to the terminal. Therefore, the terminal can send different reference signals on different reference signal resources, and the network device determines, by using the different reference signals, channel quality of radio frequency links corresponding to different antenna ports, thereby implementing radio frequency link sharing, improving radio frequency link utilization, and increasing an uplink transmission rate.

Further, in the second case, one IE is added to the first configuration information to indicate port numbers of the first quantity of antenna ports, and one IE is added to the first configuration information to indicate the port numbers of the first quantity of antenna ports; and one IE is added to the second configuration information to indicate port numbers of the second quantity of antenna ports, and one IE is added to the second configuration information to indicate the port numbers of the second quantity of antenna ports. For example, the added IE is expressed as follows: associatedAntennaPortList SEQUENCE (SIZE(1 . . . maxNrofSRS-Ports)) OF associatedAntennaPort, where associatedAntennaPortList is a list of antenna ports supported by an IE name, SEQUENCE is a type of the IE, and SIZE is a length of the list, in other words, a maximum quantity of antenna ports. Port numbers of the first quantity of antenna ports may be listed by using the IE or port numbers of the second quantity of antenna ports may be listed by using the IE.

For example, the maximum quantity of antenna ports that can be supported by the terminal is 4, and the third reference signal resource configured by the first network device for the terminal are used for two antenna ports (that is, ports2). Further, the first network device indicates, based on the first configuration information, that port numbers of the two antenna ports are AntennaPort0 and AntennaPort1, and the terminal can determine to send a reference signal on the third reference signal resource through the two antenna ports AntennaPort0 and AntennaPort1 according to indications of two IEs in the first configuration information.

For another example, the first configuration information indicates that a quantity of antenna ports using the third reference signal resource is one port, and the second configuration information indicates that antenna ports using the fourth reference signal resource is two ports. The first configuration information further indicates that a port number of the antenna port using the third reference signal resource is AntennaPort0, and the second configuration information further indicates that the antenna ports using the fourth reference signal resource are AntennaPort0 and AntennaPort1. The terminal sends the first reference signal on the third reference signal resource through AntennaPort0 and sends the second reference signal on the fourth reference signal resource through AntennaPort0 and AntennaPort1. After receiving the first reference signal and the second reference signal, the first network device jointly estimates, based on the first reference signal and the second reference signal, a channel status corresponding to AntennaPort0, and estimates a channel status of AntennaPort1 based on the second reference signal.

In this way, the network device can jointly perform channel state estimation based on a plurality of reference signals, thereby improving estimation precision.

Figure 6:
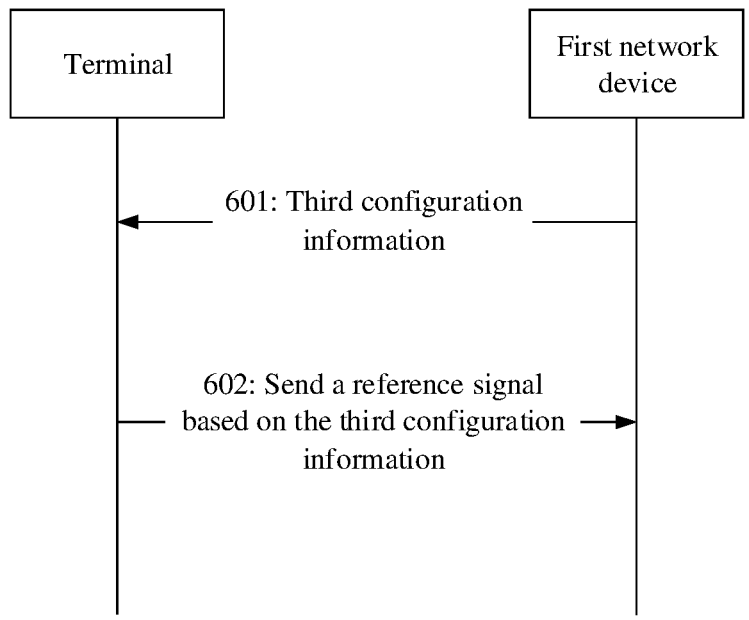
FIG. 6 is a schematic flowchart of a communications method 3 according to an embodiment.

Based on the descriptions of Embodiment 1 and Embodiment 2, as shown in FIG. 6, an embodiment may further provide a communications method 3. The communications method 3 may independently constitute a solution or may be combined with the communications method 1 and/or the communications method 2 to constitute a solution.

Step 601: A first network device sends configuration information to a terminal, and the terminal receives the third configuration information from the first network device.

To be distinguished from the configuration information described in Embodiment 2, the configuration information herein is referred to as the third configuration information. The third configuration information is used to indicate the terminal to send a reference signal to the first network device through both a first antenna port and a second antenna port within a first time and send a reference signal to the first network device through only the first antenna port within a second time, or the third configuration information is used to indicate the terminal to send a reference signal to the first network device through a second quantity of antenna ports within the first time and send a reference signal to the first network device through a first quantity of antenna ports within the second time.

The first time and the second time are adjacent and are alternated in time domain.

If a reference signal is periodic, the first network device configures a period value A for the terminal, and further configures a time length B. In this case, within one period, the first time is from a start location to a location whose length is B, and the second time is a remaining part whose length is A-B within the period. Alternatively, the two time lengths configured by the network device for the terminal are respectively A and B, where A corresponds to the first time, and B corresponds to the second time. After the configuration is complete, A and B appear alternately and periodically.

Step 602: The terminal sends a reference signal based on the third configuration information, and the first network device receives the reference signal sent by the terminal.

With reference to the descriptions of Embodiment 2, the first configuration information is used to indicate a first reference signal resource of the first antenna port, and the second configuration information is used to indicate a second reference signal resource of the second antenna port. Based on the third configuration information, the terminal sends a reference signal on the first reference signal resource through the first antenna port within the first time and sends a reference signal on the second reference signal resource through the second antenna port within the first time. The terminal sends a reference signal on the first reference signal resource through only the first antenna port within the second time. Further with reference to the descriptions of Embodiment 1, for example, the first time may be applied to the second application scenario in which the terminal sends a signal through both the first antenna port and the second antenna port, and the second time may be applied to the first application scenario in which the terminal sends a signal through only the first antenna port.

Alternatively, with reference to the descriptions of Embodiment 2, the first configuration information is used to indicate the third reference signal resource of the first quantity of antenna ports, and the second configuration information is used to indicate the fourth reference signal resource of the second quantity of antenna ports. Based on the third configuration information, the terminal sends a reference signal on the fourth reference signal resource through the second quantity of antenna ports within the first time and sends a reference signal on the third reference signal resource through the first quantity of antenna ports within the second time. Further with reference to the descriptions of Embodiment 1, for example, the first time may be applied to the second application scenario in which the terminal sends a signal through the second quantity of antenna ports, and the second time may be applied to the first application scenario in which the terminal sends a signal through the first quantity of antenna ports.

Figure 7:
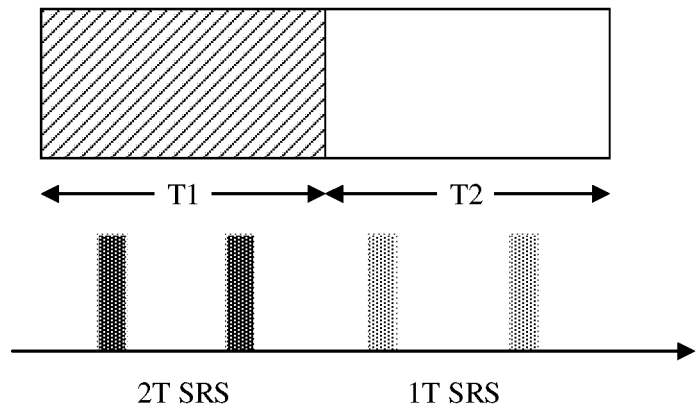
FIG. 7 is a schematic diagram of a signal sending mode according to an embodiment.

As shown in FIG. 7, the first time is represented by T1, and the second time is represented by T2. Within T1, the terminal sends an SRS signal through the first antenna port and the second antenna port, in other words, sends the SRS signal by using 2T. Within T2, the terminal sends an SRS signal through the first antenna port, in other words, sends the SRS signal by using 1T. Herein, 2T means 2 transmissions, in other words, two antenna ports or two radio frequency links; and 1T means 1 transmission, in other words, one antenna port or one radio frequency link.

SRS types include a periodic SRS, a semi-persistent SRS, and an aperiodic SRS. Therefore, for different types of SRSs, an actual sending manner for the foregoing sending mode is as follows:

For the periodic SRS, after configuration is completed, within the first time, a reference signal is sent to the first network device through both the first antenna port and the second antenna port within each period, in other words, within the first time, a reference signal is sent to the first network device through the second quantity of antenna ports within each period; and within the second time, a reference signal is sent to the first network device through only the first antenna port within each period, in other words, within the second time, a reference signal is sent to the first network device through the first quantity of antenna ports within each period.

For the semi-persistent SRS, after configuration is completed, during activation, within the first time, a reference signal is sent to the first network device through both the first antenna port and the second antenna port within each period, in other words, within the first time, a reference signal is sent to the first network device through the second quantity of antenna ports within each period; and within the second time, a reference signal is sent to the first network device through only the first antenna port within each period, in other words, within the second time, a reference signal is sent to the first network device through the first quantity of antenna ports within each period.

For the aperiodic SRS, sending of an SRS needs to be triggered by using downlink control information (DCI), and a corresponding SRS index value is indicated in the DCI. In this embodiment, an index value in the DCI may be indicated in different manners. For example, if a corresponding field in the DCI is "01", it indicates that sending of "an SRS whose index value is equal to 1 in an SRS resource set" is triggered. If the DCI and/or an SRS corresponding to the DCI are/is sent within the first time, it indicates that the DCI triggers sending of the first reference signal, and the terminal sends the first reference signal through the first antenna port and the second antenna port, or the terminal sends the first reference signal through the second quantity of antenna ports. If the DCI and/or an SRS corresponding to the DCI are/is sent within the second time, it indicates that the DCI triggers sending of the second reference signal, and the terminal sends the second reference signal through the first antenna port, or the terminal sends the second reference signal through the first quantity of antenna ports.

In the foregoing sending mode in which the first time and the second time that are configured by the network device for the terminal are alternated, the terminal can use the uplink communication capability described in Embodiment 1 within the first time. An antenna capability used when the terminal sends a signal to the first network device is a first value in the first application scenario, and the antenna capability used when the terminal sends a signal to the first network device is a second value in the second application scenario. However, the uplink communication capability is not allowed to be used within the second time. In this way, a second network device can schedule the terminal within the second time but cannot schedule the terminal within the first time. The sending mode is determined, so that the terminal, the first network device, and the second network device can reach a consensus on a time at which an idle radio frequency link can be opportunistically used for joint signal sending and a time at which an idle radio frequency link cannot be used for joint signal sending.

Figure 8:
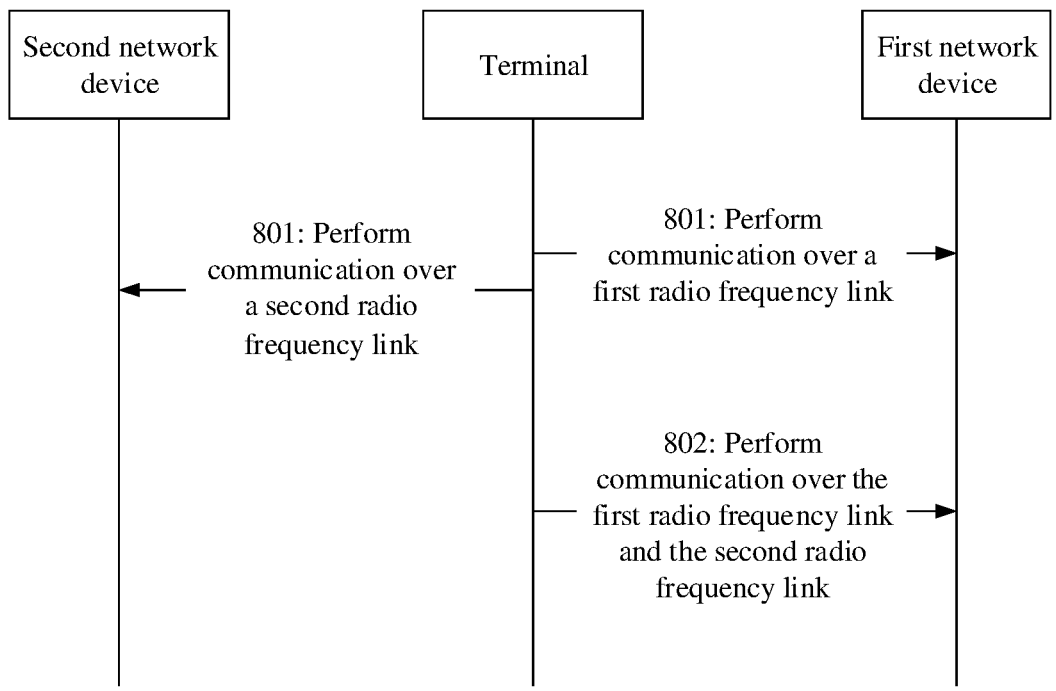
FIG. 8 is a schematic flowchart of a communications method 4 according to an embodiment.

Based on the descriptions of the foregoing several embodiments, as shown in FIG. 8, an embodiment may further provide a communications method 4, to implement radio frequency link sharing. A method is described as follows:

Step 801: On a first time domain resource, a terminal communicates with a first network device over a first radio frequency link and communicates with a second network device over a second radio frequency link.

Step 802: The terminal communicates with the first network device on a second time domain resource over the first radio frequency link and the second radio frequency link.

The first time domain resource may be a subframe, a slot, or a symbol, and the second time domain resource is a subframe, a slot, or a symbol. On the first time domain resource, the terminal communicates with the first network device on a first frequency domain resource over the first radio frequency link and communicates with the second network device on a second frequency domain resource over the second radio frequency link. On the second time domain resource, the terminal communicates with the first network device on the first frequency domain resource over the first radio frequency link and the second radio frequency link.

It should be noted that the communications method 1, the communications method 2, the communications method 3, and the communications method 4 provided in the embodiments can independently constitute the solution, or may be randomly combined to constitute the solution.

Figure 9:
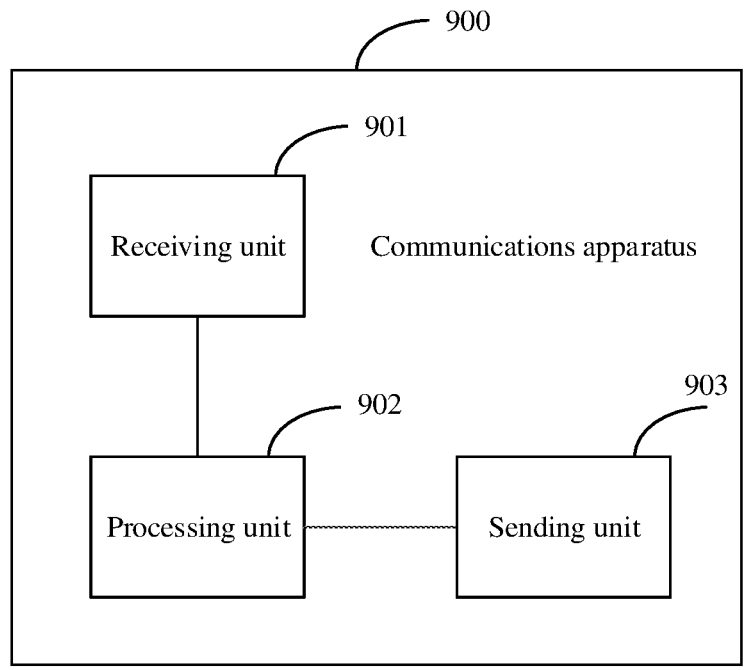
FIG. 9 is a schematic structural diagram 1 of a communications apparatus according to an embodiment.

Based on the foregoing method embodiment, as shown in FIG. 9, an embodiment may further provide a communications apparatus 900. The communications apparatus 900 is configured to perform an operation performed by the terminal in any one of the foregoing methods in Embodiment 1 to Embodiment 4. The communications apparatus 900 includes a receiving unit 901, a processing unit 902, and a sending unit 903. The receiving unit 901 is configured to receive information, a signal, or data from a network device. For example, with reference to the communications method 2, the receiving unit 901 may be configured to receive the configuration information of the network device. The sending unit 903 is configured to send information, or a signal, or data to the network device. For example, with reference to the communications method 1, the sending unit 903 may be configured to report the uplink communication capability of the terminal to the first network device or the second network device. The processing unit 902 is configured to perform an operation performed by the terminal described in the foregoing method embodiments other than signal receiving and sending operations. Details are not repeatedly described.

Figure 10:
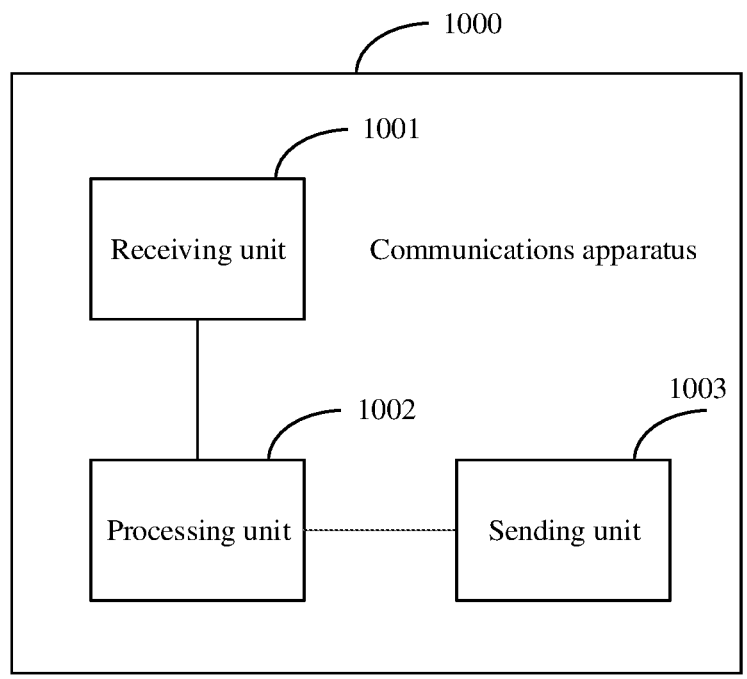
FIG. 10 is a schematic structural diagram 2 of a communications apparatus according to an embodiment.

Based on the foregoing method embodiment, as shown in FIG. 10, an embodiment may further provide a communications apparatus 1000. The communications apparatus 1000 is configured to perform an operation performed by the first network device (or the second network device) in any one or more of the foregoing methods in Embodiment 1 to Embodiment 4. The communications apparatus 1000 includes a receiving unit 1001, a processing unit 1002, and a sending unit 1003. The receiving unit 1001 is configured to receive information, or a signal, or data from a terminal. For example, with reference to the communications method 1, the receiving unit 1001 is configured to receive the uplink communication capability of the terminal from the terminal. The sending unit 903 is configured to send information, or a signal, or data to the terminal. For example, with reference to the communications method 2, the sending unit 903 is configured to send the configuration information to the terminal. The processing unit 1002 is configured to perform an operation performed by the first network device (or the second network device) described in the any one or more of the foregoing methods in Embodiment 1 to Embodiment 4 other than signal receiving and sending operations. Details are not repeatedly described.

Figure 11:
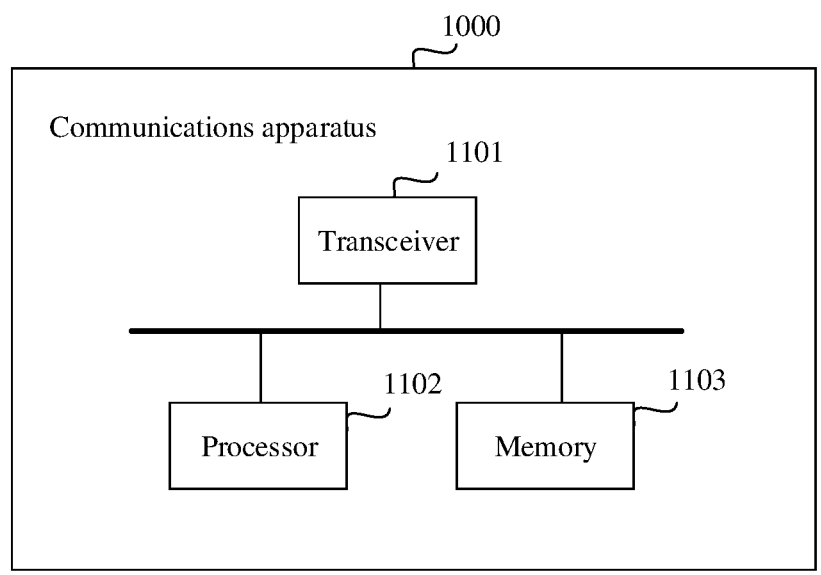
FIG. 11 is a schematic structural diagram 3 of a communications apparatus according to an embodiment.

Based on the foregoing communications method, as shown in FIG. 11, an embodiment may further provide a communications apparatus 1100. The communications apparatus 1100 includes a transceiver 1101, a processor 1102, and a memory 1103. The memory 1103 is optional. The memory 1103 is configured to store a program executed by the processor 1102. When the communications apparatus 1100 is configured to implement an operation performed by the terminal in any one or more of the foregoing methods in Embodiment 1 to Embodiment 4, the processor 1102 is configured to invoke a group of programs. When the programs are executed, the processor 1102 is enabled to perform an operation performed by the terminal in the any one or more of the foregoing methods in Embodiment 1 to Embodiment 4. Function modules in FIG. 9, in other words, the receiving unit 901 and the sending unit 903, may be implemented through the transceiver 1101, and the processing unit 902 may be implemented through the processor 1102. When the communications apparatus 1100 is configured to implement an operation performed by the first network device (or the second network device) in any one or more of the foregoing methods in Embodiment 1 to Embodiment 4, the processor 1102 is configured to invoke the group of programs. When the programs are executed, the processor 1102 is enabled to perform an operation performed by the first network device (or the second network device) in the any one or more of the foregoing methods in Embodiment 1 to Embodiment 4. Function modules in FIG. 10, in other words, the receiving unit 1001 and the sending unit 1003, may be implemented through the transceiver 1101, and the processing unit 1002 may be implemented through the processor 1102.

The processor 1102 may be a central processing unit (central processing unit, CPU), a network processor (network processor, NP), or a combination of the CPU and the NP.

The processor 1102 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 1103 may include a volatile memory, for example, a random access memory (RAM). The memory 1103 may alternatively include a nonvolatile memory, for example, a flash memory, a hard disk drive (HDD), or a solid-state drive (SSD). The memory 1103 may alternatively include a combination of the foregoing types of memories.

In the communications methods provided in the embodiments, some or all of the described operations and functions performed by the terminal, the first network device, and the second network device may be completed by using a chip or an integrated circuit.

To implement functions of the apparatus in FIG. 9, FIG. 10, or FIG. 11, an embodiment may further provide a chip, including a processor, configured to support the apparatus in implementing functions of the terminal and the network device in the communications methods provided in the foregoing embodiments. The chip may be connected to a memory or the chip includes the memory and the memory may be configured to store a program instruction and data that are necessary to the apparatus.

An embodiment may provide a non-transitory computer storage medium. The non-transitory computer storage medium stores a computer program, and the computer program includes an instruction used to perform the communications methods provided in the foregoing embodiments.

An embodiment may provide a computer program product including an instruction. When the computer program product is run on a computer, the computer is enabled to perform the communications methods in the foregoing embodiments.

Persons skilled in the art should understand that the embodiments may be provided as a method, a system, or a computer program product. Therefore, the embodiments may be in a form of a full hardware embodiment, a full software embodiment, or a combination of software and hardware embodiments. In addition, the embodiments may use a form of a computer program product that is implemented on one or more non-transitory computer-usable storage media (including, but not limited to, a magnetic disk storage, a CD-ROM, an optical memory, and the like) that include computer-usable program code.

The embodiments are described with reference to the flowcharts and/or block diagrams of the method, the device (system), and the computer program product. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or a processor of another programmable data processing device generate an apparatus for implementing a function in one or more processes in the flowcharts and/or in one or more blocks in the block diagrams.

These computer program instructions may be stored in a computer-readable memory that can indicate the computer or another programmable data processing device to work in a manner, so that the instructions stored in the computer-readable memory generate an artifact that includes an instruction apparatus. The instruction apparatus implements a function in one or more processes in the flowcharts and/or in one or more blocks in the block diagrams.

These computer program instructions may be loaded onto a computer or another programmable data processing device, so that a series of operation steps are performed on the computer or the another programmable device, thereby generating computer-implemented processing. Therefore, the instructions executed on the computer or the another programmable device provide steps for implementing a function in one or more processes in the flowcharts and/or in one or more blocks in the block diagrams.

Although some embodiments have been described, persons skilled in the art can make changes and modifications to these embodiments.

What is claimed is:

1. A communication method, performed by a terminal, wherein the terminal comprises a first radio frequency link and a second radio frequency link, and the terminal is able to access a first network device and a second network device through dual connectivity (DC), or carrier aggregation (CA); the communication method comprising:
   in a first application scenario, communicating, by the terminal, with the first network device over the first radio frequency link, and communicating with the second network device over the second radio frequency link; and
   in a second application scenario, communicating, by the terminal, with the first network device over the first radio frequency link and the second radio frequency link; wherein the first application scenario is that the terminal sends a signal to the second network device, and the second application scenario is that the terminal does not send a signal to the second network device.

2. The communication method according to claim 1, further comprising:
   receiving, by the terminal, a first configuration information and a second configuration information from the first network device, wherein the first configuration information is used to indicate a first reference signal resource of a first antenna port, and the second configuration information is used to indicate a second reference signal resource of a second antenna port; or the first configuration information is used to indicate a third reference signal resource of a first quantity of antenna ports, and the second configuration information is used to indicate a fourth reference signal resource of a second quantity of antenna ports;
   sending, by the terminal, a first reference signal based on the first configuration information; and
   sending a second reference signal based on the second configuration information.

3. The communication method according to claim 2, wherein an information element (IE) in the first configuration information is used to indicate the first reference signal resource, and an IE in the second configuration information is used to indicate the second reference signal resource.

4. The communication method according to claim 1, further comprising:
   receiving, by the terminal, indication information from the first network device or the second network device, wherein the indication information is used to indicate the terminal to enable an uplink communication capability of the terminal.

5. The communication method according to claim 4, wherein the indication information enables the terminal to communicate with the first network device over the second radio frequency link when the second radio frequency is idle.

6. A communication apparatus, comprising a sending unit with a first radio frequency link and a second radio frequency link, wherein the sending unit is able to access a first network device and a second network device through dual connectivity (DC), or carrier aggregation (CA), and wherein the sending unit is configured to:
   in a first application scenario, communicate with the first network device over the first radio frequency link, and communicate with the second network device over the second radio frequency link; and
   in a second application scenario, communicate with the first network device over the first radio frequency link and the second radio frequency link, wherein
   the first application scenario is that the terminal sends a signal to the second network device, and the second application scenario is that the terminal does not send a signal to the second network device.

7. The communication apparatus according to claim 6, further comprising a receiving unit, wherein the receiving unit is configured to:
   receive first configuration information and second configuration information from the first network device, wherein the first configuration information is used to indicate a first reference signal resource of a first antenna port, and the second configuration information is used to indicate a second reference signal resource of a second antenna port; or the first configuration information is used to indicate a third reference signal resource of a first quantity of antenna ports, and the second configuration information is used to indicate a fourth reference signal resource of a second quantity of antenna ports; and the sending unit is further configured to:
   send a first reference signal based on the first configuration information, and
   send a second reference signal based on the second configuration information.

8. The communication apparatus according to claim 7, wherein an information element (IE) in the first configuration information is used to indicate the first reference signal resource, and an IE in the second configuration information is used to indicate the second reference signal resource.

9. The communication apparatus according to claim 6, wherein the receiving unit is further configured to:
   receive indication information from the first network device or the second network device, wherein the indication information is used to indicate the communications apparatus to enable an uplink communication capability of the communications apparatus.

10. The communication apparatus according to claim 9, wherein the indication information enables the communications apparatus to communicate with the first network device over the second radio frequency link when the second radio frequency is idle.

11. A non-transitory computer-readable storage medium, wherein the non-transitory computer storage medium stores computer-readable instructions; and when a terminal comprising the non-transitory computer-readable storage medium reads and executes the computer-readable instructions, the terminal is enabled to perform a method comprising:
- in a first application scenario, communicating, by the terminal, with the first network device over the first radio frequency link, and communicating with the second network device over the second radio frequency link; and
- in a second application scenario, communicating, by the terminal, with the first network device over the first radio frequency link and the second radio frequency link; wherein the first application scenario is that the terminal sends a signal to the second network device, and the second application scenario is that the terminal does not send a signal to the second network device.

12. The non-transitory computer-readable storage medium according to claim 11, wherein when the terminal reads and executes the computer-readable instructions, the method performed by the terminal further comprises:
- receiving, by the terminal, a first configuration information and a second configuration information from the first network device, wherein the first configuration information is used to indicate a first reference signal resource of a first antenna port, and the second configuration information is used to indicate a second reference signal resource of a second antenna port; or the first configuration information is used to indicate a third reference signal resource of a first quantity of antenna ports, and the second configuration information is used to indicate a fourth reference signal resource of a second quantity of antenna ports;
- sending, by the terminal, a first reference signal based on the first configuration information; and
- sending a second reference signal based on the second configuration information.

13. The non-transitory computer-readable storage medium according to claim 12, wherein an information element (IE) in the first configuration information is used to indicate the first reference signal resource, and an IE in the second configuration information is used to indicate the second reference signal resource.

14. The non-transitory computer-readable storage medium according to claim 11, wherein when the terminal reads and executes the computer-readable instructions, the method performed by the terminal further comprises:
- receiving, by the terminal, indication information from the first network device or the second network device, wherein the indication information is used to indicate the terminal to enable an uplink communication capability of the terminal.

15. The non-transitory computer-readable storage medium according to claim 14, wherein the indication information enables the terminal to communicate with the first network device over the second radio frequency link when the second radio frequency is idle.

* * * * *